US011435198B2

(12) United States Patent
Kolambekar et al.

(10) Patent No.: US 11,435,198 B2
(45) Date of Patent: Sep. 6, 2022

(54) DYNAMIC RESPONSIVE TRANSIT MANAGEMENT SYSTEM

(71) Applicant: Skylark Innovations LLC, Ashburn, VA (US)

(72) Inventors: Amit Kolambekar, Chicago, IL (US); Bhavin B. Parikh, Ashburn, VA (US)

(73) Assignee: Skylark Innovations, LLC, Ashburn, VA (US)

( * ) Notice: Subject to any disclaimer, the term of this patent is extended or adjusted under 35 U.S.C. 154(b) by 389 days.

(21) Appl. No.: 16/572,256

(22) Filed: Sep. 16, 2019

(65) Prior Publication Data

US 2020/0088531 A1    Mar. 19, 2020

Related U.S. Application Data

(60) Provisional application No. 62/732,085, filed on Sep. 17, 2018.

(51) Int. Cl.
*G01C 21/00* (2006.01)
*G01C 21/34* (2006.01)
(Continued)

(52) U.S. Cl.
CPC .......... *G01C 21/343* (2013.01); *G01C 21/20* (2013.01); *G06F 16/23* (2019.01); *G06Q 20/10* (2013.01)

(58) Field of Classification Search
CPC ....... G01C 21/343; G01C 21/20; G06F 16/23; G06Q 20/10; G06Q 10/047; G06Q 10/0631; G06Q 50/30; G08G 1/127
See application file for complete search history.

(56) References Cited

U.S. PATENT DOCUMENTS

2010/0299177 A1\* 11/2010 Buczkowski .... G06Q 10/06311
705/7.13
2011/0166958 A1\* 7/2011 Hamilton, II ...... G06Q 30/0607
705/13
(Continued)

OTHER PUBLICATIONS

The International Searching Authority, Notification of Transmittal of the International Search Report and Written Opinion of the International Searching Authority dated Apr. 1, 2020 for International Application No. PCT/US19/51332, 13 pages.

*Primary Examiner* — Peter D Nolan
*Assistant Examiner* — Peter Y Ning
(74) *Attorney, Agent, or Firm* — Dickinson Wright, PLLC; Jonathan H. Harder

(57) ABSTRACT

This application relates to a method for establishing a finalized route for transporting passengers throughout a region to an event, is described. The method includes determining a tentative route for transporting the passengers to the event, where determining the tentative route includes: determining event information for the event that is scheduled to occur in the region, where the event information includes at least one of (i) a time associated with the event or (ii) a location associated with the event. The method further includes determining the finalized route for transporting the passengers to the event by adjusting the tentative route, where adjusting the tentative route includes at least one of (i) determining a change in status of the tentative route or (ii) determining a geographical condition associated with the region. The method further includes publishing the finalized route.

20 Claims, 19 Drawing Sheets

(51) Int. Cl.
    *G01C 21/20* (2006.01)
    *G06F 16/23* (2019.01)
    *G06Q 20/10* (2012.01)

(56) References Cited

U.S. PATENT DOCUMENTS

| | | | |
|---|---|---|---|
| 2011/0225269 A1* | 9/2011 | Yap | G06Q 10/06 709/219 |
| 2014/0046585 A1* | 2/2014 | Morris, IV | G08G 1/205 701/400 |
| 2015/0073687 A1* | 3/2015 | Hampapur | G06Q 10/047 701/117 |
| 2015/0324717 A1* | 11/2015 | Lord | G06Q 10/063114 705/7.13 |
| 2016/0334235 A1* | 11/2016 | Gustafson | G01C 21/3492 |
| 2017/0053531 A1* | 2/2017 | Ullrich | G08G 1/096844 |
| 2017/0059337 A1* | 3/2017 | Barker | G01C 21/343 |
| 2017/0227367 A1* | 8/2017 | Thangaraj | G01C 21/3423 |
| 2017/0365166 A1 | 12/2017 | Lu et al. | |
| 2018/0143027 A1* | 5/2018 | Schlesinger | G01C 21/343 |
| 2018/0172460 A1* | 6/2018 | Yano | B61L 27/16 |

\* cited by examiner

530: System 102 generates tentative route

DATABASE 160 OF SYSTEM 102

| DATA | DATA TYPE | DEVICE ID | TIME STAMP |
|---|---|---|---|
| *** | *** | *** | *** |
| 50% | OCCUPANCY | 7 HAIGHT | 11:50 AM |
| 70 °F LIGHT RAIN SHOWERS | WEATHER | DEVICE_1 | 12:05 PM |
| UCSF GRADUATION CEREMONY @ 1:00 PM | OTHER EVENT | DEVICE_1 | 10:30 AM |
| JAL JL2 ON TIME; 12:00 PM ETA | VEHICLE STATUS | JAL JL2 | 11:30 AM |
| UCSF STOP | GPS | 6 HAIGHT | 12:10 PM |
| MONTGOMERY ST. STATION | GPS | BART | 12:00 PM |
| OB SURF CONTEST STARTS @ 2:00 PM | EVENT INFO | INTERNET | 8:00 AM |
| MEDIUM TRAFFIC IN SOUTH SF AND SOMA | TRAFFIC STATUS | TRAFF. INDX | 12:05 PM |
| DROP OFF LOCATION: OB SURF CONTEST | RIDE REQUEST | MICK_F | 12:25 PM |
| PICK UP LOCATION: SFO AIRPORT | RIDE REQUEST | MICK_F | 12:25 PM |
| CURRENT LOCATION: INTL TERMINAL DOOR 3 | RIDE REQUEST | ANDY_I | 12:30 PM |
| PICK UP LOCATION: FAIRMONT HOTEL | RIDE REQUEST | ANDY_I | 12:30 PM |
| DROP OFF LOCATION: OB SURF CONTEST | RIDE REQUEST | KELLY_S | 12:30 PM |
| PICK UP LOCATION: RITZ-CARLTON HOTEL | RIDE REQUEST | KELLY_S | 12:30 PM |
| DROP OFF LOCATION: OB SURF CONTEST | RIDE REQUEST | KELLY_S | 12:30 PM |
| 17 ATTENDEES STAYING AT WESTIN HOTEL | EVENT INFO | INTERNET | 12:35 PM |

534

TENTATIVE RT GENERATOR 132

| OPERATOR | STOP #1 | | STOP #2 | | STOP #3 | | STOP #4 | | END |
|---|---|---|---|---|---|---|---|---|---|
| LINE 1 | 12:50 PM | | 1:15 PM | | 1:25 PM | | 1:35 PM | | 1:45 PM |
| ROUTE | | | | | | | | | |
| SFO AIRPORT >> OCEAN BEACH (NORIEGA ST)<br>1ST STOP WESTIN HOTEL<br>2ND STOP FAIRMONT HOTEL<br>3RD STOP RITZ-CARLTON HOTEL | | | | | | | | | |

540: System 102 generates finalized route

DATABASE 160 OF SYSTEM 102 — 542

| DATA | DATA TYPE | DEVICE ID | TIME STAMP |
|---|---|---|---|
| *** | *** | *** | *** |
| 50% | OCCUPANCY | 7 HAIGHT | 11:50 AM |
| 70 °F LIGHT RAIN SHOWERS | WEATHER | DEVICE_1 | 12:05 PM |
| UCSF GRADUATION CEREMONY @ 1:00 PM | OTHER EVENT | DEVICE_1 | 10:30 AM |
| JAL JL2 ON TIME; 12:00 PM ETA | VEHICLE STATUS | JAL JL2 | 11:30 AM |
| UCSF STOP | GPS | 6 HAIGHT | 12:10 PM |
| MONTGOMERY ST STATION | GPS | BART | 12:00 PM |
| OB SURF CONTEST STARTS @ 2:00 PM | EVENT INFO | INTERNET | 8:00 AM |
| MEDIUM TRAFFIC IN SOUTH SF AND SOMA | TRAFFIC STATUS | TRAFF. INDX | 12:05 PM |
| DROP OFF LOCATION: OB SURF CONTEST | RIDE REQUEST | MICK_F | 12:25 PM |
| PICK UP LOCATION: SFO AIRPORT | RIDE REQUEST | MICK_F | 12:25 PM |
| CURRENT LOCATION: INTL TERMINAL DOOR 3 | RIDE REQUEST | MICK_F | 12:25 PM |
| PICK UP LOCATION: FAIRMONT HOTEL | RIDE REQUEST | ANDY_I | 12:30 PM |
| DROP OFF LOCATION: OB SURF CONTEST | RIDE REQUEST | ANDY_I | 12:30 PM |
| PICK UP LOCATION: RITZ-CARLTON HOTEL | RIDE REQUEST | KELLY_S | 12:30 PM |
| DROP OFF LOCATION: OB SURF CONTEST | RIDE REQUEST | KELLY_S | 12:30 PM |
| 17 ATTENDEES STAYING AT WESTIN HOTEL | EVENT INFO | INTERNET | 12:35 PM |
| MAJOR TRAFF. ACCIDENT 101 N @ 6TH ST | TRAFFIC STATUS | TRAFF. INDX | 12:47 PM |
| 88% CAPACITY | OCCUPANCY | 7 HAIGHT | 12:49 PM |

FINALIZED RT. GENERATOR 134 — 544

| ROUTE | OPERATOR | STOP #1 | STOP #2 | STOP #3 | STOP #4 | END |
|---|---|---|---|---|---|---|
| SFO AIRPORT >> OCEAN BEACH (NORIEGA ST)<br>2ND STOP WESTIN HOTEL<br>3RD STOP FAIRMONT HOTEL<br>4TH STOP RITZ-CARLTON HOTEL | LINE 1 | 12:55 PM | 1:20 PM | 1:30 PM | 1:45 PM | 1:55 PM |

*FIG. 5D*

550: System 102 generates multiple finalized routes

| FINALIZED RT. GENERATOR 134 | | | | | | |
|---|---|---|---|---|---|---|
| ROUTE | OPERATOR | STOP #1 | STOP #2 | STOP #3 | STOP #4 | END |
| SFO AIRPORT >> OCEAN BEACH (NORIEGA ST) 2ND STOP WESTIN HOTEL 3RD STOP FAIRMONT HOTEL 4TH STOP RITZ-CARLTON HOTEL | LINE 1 | 12:55 PM | 1:20 PM | 1:30 PM | 1:45 PM | 1:55 PM |
| ROUTE | OPERATOR | STOP #1 | STOP #2 | STOP #3 | STOP #4 | END |
| SFO AIRPORT >> OCEAN BEACH (NORIEGA ST) 2ND STOP WESTIN HOTEL 3RD STOP FAIRMONT HOTEL 4TH STOP RITZ-CARLTON HOTEL | LINE 2 | 12:55 PM | 1:25 PM | 1:35 PM | 1:50 PM | 2:00 PM |
| ROUTE | OPERATOR | STOP #1 | STOP #2 | STOP #3 | STOP #4 | END |
| SFO AIRPORT >> OCEAN BEACH (NORIEGA ST) 2ND STOP WESTIN HOTEL 3RD STOP FAIRMONT HOTEL 4TH STOP RITZ-CARLTON HOTEL | LINE 3 | 12:55 PM | 1:20 PM | 1:30 PM | 1:45 PM | 1:55 PM |

*FIG. 5E*

610: System 102 receives bids from operators for finalized routes

BID MARKET 252

| ROUTE | OPERATOR | STOP #1 | STOP #2 | STOP #3 | STOP #4 | END |
|---|---|---|---|---|---|---|
| SFO AIRPORT >> OCEAN BEACH (NORIEGA ST) 2ND STOP WESTIN HOTEL 3RD STOP FAIRMONT HOTEL 4TH STOP RITZ-CARLTON HOTEL | LINE 1 | 12:55 PM | 1:20 PM | 1:30 PM | 1:45 PM | 1:55 PM |
| ROUTE | OPERATOR | STOP #1 | STOP #2 | STOP #3 | STOP #4 | END |
| SFO AIRPORT >> OCEAN BEACH (NORIEGA ST) 2ND STOP WESTIN HOTEL 3RD STOP FAIRMONT HOTEL 4TH STOP RITZ-CARLTON HOTEL | LINE 2 | 12:55 PM | 1:25 PM | 1:35 PM | 1:50 PM | 2:00 PM |
| ROUTE | OPERATOR | STOP #1 | STOP #2 | STOP #3 | STOP #4 | END |
| SFO AIRPORT >> OCEAN BEACH (NORIEGA ST) 2ND STOP WESTIN HOTEL 3RD STOP FAIRMONT HOTEL 4TH STOP RITZ-CARLTON HOTEL | LINE 3 | 12:55 PM | 1:20 PM | 1:30 PM | 1:45 PM | 1:55 PM |

— 552, 554, 556

RECEIVED BIDS 254

| OPERATOR | SERVICE | COST | FLEET | RATE | BID STATUS |
|---|---|---|---|---|---|
| PACIFIC NORTHWEST TRANSPORT COMPANY | LINES 1 - 3 | $5,200 | 3 BUSES | 4.5 STARS | PENDING |
| CALIFORNIA FUN TRANSPORT COMPANY | LINES 1 - 3 | $5,250 | 5 BUSES | 4.7 STARS | PENDING |
| ALL DAY TRANSPORT COMPANY | LINES 2 - 3 | $3,000 | 2 BUSES | 3.9 STARS | PENDING |

620: System 102 accepts bids from operators for finalized routes

RECEIVED BIDS 254

| OPERATOR | SERVICE | COST | FLEET | RATE | BID STATUS |
|---|---|---|---|---|---|
| PACIFIC NORTHWEST TRANSPORT COMPANY | LINES 1 - 3 | $5,200 | 3 BUSES | 4.5 STARS | DENIED |
| CALIFORNIA FUN TRANSPORT COMPANY | LINES 1 - 3 | $5,250 | 5 BUSES | 4.7 STARS | ACCEPTED |
| ALL DAY TRANSPORT COMPANY | LINES 2 - 3 | $3,000 | 2 BUSES | 3.9 STARS | DENIED |

DYNAMIC RESPONSIVE TRANSIT MANAGEMENT SYSTEM

CROSS-REFERENCE TO RELATED APPLICATIONS

The present application claims the benefit of U.S. Provisional Application No. 62/732,085, entitled "DEMAND RESPONSIVE TRANSPORTATION MANAGEMENT SYSTEM" filed Sep. 17, 2018, the contents of which are incorporated herein by reference in its entirety for all purposes.

FIELD

The described embodiments relate generally to various techniques for managing transit vehicles to transport passengers to an event along a route. More particularly, the described embodiments involve dynamically establishing the route based upon multiple received inputs, and, thereafter, publishing the route.

BACKGROUND

In recent years, a variety of different transportation options have facilitated the transportation of passengers to events. However, conventional transportation of passengers is based on either a fixed route or a fixed time schedule. Consequently, the conventional means of transporting passengers fail to adapt to constant changing passenger demand and updated travel information.

SUMMARY

To cure the foregoing deficiencies, the representative embodiments set forth herein disclose various techniques for managing transit vehicles to transport passengers to an event along a route. More particularly, the described embodiments involve dynamically establishing the route based upon multiple received inputs, and, thereafter, publishing the route.

According to some embodiments, a method for transporting passengers in a region to an event is described. The method includes determining a tentative route for transporting the passengers to the event, where determining the tentative route includes: receiving, from at least one client device, a request from a passenger to travel to the event, where the request includes at least one of (i) a pick up location or (ii) a drop off location for the passenger, and determining event information for the event, where the event information includes at least one of (i) a time associated with the event or (ii) a location associated with the event. The method further includes determining a finalized route for transporting the passengers to the event by adjusting the tentative route, where adjusting the tentative route includes at least one of (i) determining a change in status of the tentative route or (ii) determining a geographical condition associated with the region. The method further includes publishing the finalized route to at least one database.

According to some embodiments, a method for transporting passengers in a region to an event is described. The method includes determining event information for the event, receiving shared data associated with the region, based on the shared data, establishing at least a first tentative route having a first weighted value and a second tentative route having a second weighted value. The method further includes determining whether the first weighted value is at least one of (i) greater than the second weighted value, or (ii) satisfies a condition threshold value, and in response to determining that the first weighted value is at least one of (i) greater than the second weighted value, or (ii) satisfies the condition threshold value: establishing the first tentative route as a finalized route, and publishing the finalized route to the database.

According to some embodiments, a method for establishing a finalized route for transporting passengers throughout a region to an event, is described. The method includes determining a tentative route for transporting the passengers to the event, where determining the tentative route includes: determining event information for the event that is scheduled to occur in the region, where the event information includes at least one of (i) a time associated with the event or (ii) a location associated with the event. The method further includes determining the finalized route for transporting the passengers to the event by adjusting the tentative route, where adjusting the tentative route includes at least one of (i) determining a change in status of the tentative route or (ii) determining a geographical condition associated with the region. The method further includes publishing the finalized route to at least one database.

Other embodiments include a non-transitory computer readable storage medium configured to store instructions that, when executed by at least one processor included in a computing device, cause the computing device to carry out the various steps of any of the foregoing methods. Further embodiments include a computing device having at least one memory storing instructions that include the various steps of any of the foregoing methods and at least one processor that is configured to carry out the instructions.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 5A-5E illustrate exemplary conceptual diagrams of establishing a finalized route for transporting passengers to an event, according to some embodiments.

FIGS. 6A-6B illustrate exemplary conceptual diagrams of pairing a finalized route to one or more operators, according to some embodiments.

DETAILED DESCRIPTION

Figure 1:
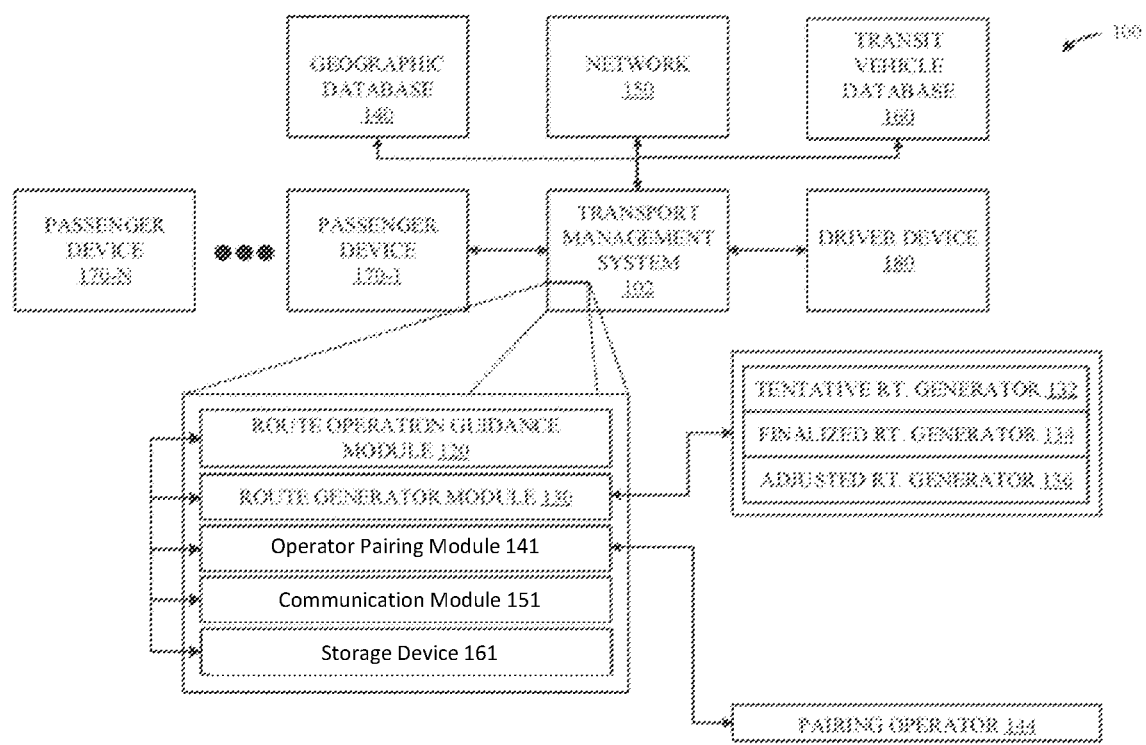
FIGS. 1-3 illustrate block diagrams of different computing devices that may be configured to implement different aspects of the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In recent years, a variety of different transportation options have facilitated the transportation of passengers to events and multiple stops in a region. However, conventional transportation of passengers is based on either a fixed route or a fixed time schedule. Consequently, the conventional means of transporting passengers fail to adapt to constant changing passenger demand and updated travel related information. For example, public mass transport operated by cities include buses, subways, and trains. The public mass transport system operates according to an established route and/or a fixed time schedule. The stops along the established route are fixed and passengers are required to depart and disembark at predetermined stops.

According to some embodiments, the techniques described herein relate to dynamically and automatically establishing a route for transporting multiple passengers in a region to at least one event. In particular, the techniques described herein involve a tentative route generator module may establish a tentative route that is based upon shared data available and/or stored at a database that includes event information, activities, workplace information, weather data, traffic data, historical data, lodging information, and the like. In response, the tentative route generator module establishes one or more tentative routes for transporting the passengers to the event. Subsequently, a finalized route generator module establishes a finalized route based on travel related information.

In some embodiments, the finalized route is generated by the transport management system in response to receiving one or more requests from passengers for transportation to an event. In some embodiments, the finalized route is generated by the transport management system without having previously received at least one request from a passenger for transportation to an event. Thereafter, the finalized route may be published to an online marketplace. The transport management system may solicit bids from at least one operator to be paired with the finalized route. The transport management system is capable of estimating time-based travel demand, estimate number of vehicles required to satisfy the travel demand, approximate wait time for passengers, required capacity, and the like. The at least one operator is capable of pairing with the finalized route and, subsequently, operating the route. Passengers may be notified of the operator operating the route and travel related information such as time schedule, stops, and the like. Passengers interested in transportation services may search and discover available transportation based on details associated with an event or based on their proximity to the route(s) associated with the event. Passengers will be capable of using their client device (e.g., smartphone, etc.) to live track vehicles operating the routes, receive notifications, and pay for transportation.

According to one example that may be implemented using the techniques described herein, the transport management system may determine that an event is to be held at a convention center for five days. Housing details of hotels nearby the convention center may include attendees who are registered to attend the event. The transport management system may search and detect shared data available to automatically generate a route that encompasses all nearby hotels so as to consolidate the number of hotels serviced by a stop along the route. Alternatively, the transport management system may automatically generate a route that includes at least one common stop for servicing multiple, nearby hotels in order to create a more efficient route. The route may also include multiple common stops.

According to one example that may be implemented using the techniques described herein, the transport management system may determine from established public transportation routes (e.g., bus schedules, train schedules, etc.) and generate optimized routes that minimize overlap with the published transportation routes, and; therefore, maximize ridership in the fleet vehicle operating along the optimized routes. For example, if public transportation is readily available for certain hotels nearby the convention center, then the transport management system is capable of generating optimized routes that bypass the certain hotels and instead service other hotels without public transportation coverage.

According to one example that may be implemented using the techniques described herein, the transport management system is capable of analyzing publicly available ridership data and drop-off data published by municipalities, urban planning departments, ride sharing companies, taxi services, etc. to generate optimize routes that service one or more events. For example, if the public transportation system runs extra buses to cover high ridership during a peak time associated with a time of the event, then the transport management system is capable of establishing an optimized route to cover the same route or an optimized route similar to the route operated by the public transportation system Although the techniques described herein are described with reference to ground transport vehicles, the techniques may be equally implemented for use with other forms of transportation, such as, but not limited to underground travel (e.g., subway, etc.), air travel (e.g., airplanes, etc.) and water (e.g., ferry, etc.). Additionally, the techniques described herein may be equally implemented for intra-city transportation and inter-city transportation. Additionally, the techniques described herein may be equally implemented for use with autonomous vehicles and self-driving vehicles. Furthermore, the techniques described herein may be implemented with little to none human intervention or supervision.

As defined herein, a "route" is defined as a path that includes an origin (e.g., pick up location) and a destination (e.g., drop off location). In some examples, the route may include at least one stop in-between the origin and the destination. In some examples, the drop off location may also refer to the location of the event.

As further defined herein, an "established route" is defined as a route that has been published through a written and/or electronic medium and utilized previously by an operator to transport passengers. In some examples, the established route refers to a route generated by a publicly-available web mapping service. In contrast, the techniques described herein with reference to the transport management system do not utilize and/or rely upon established route(s) to provide transportation for passengers. In other words, the tentative route, finalized route, and/or adjusted finalized route that are generated by the transport management system may not be identical to an established route.

As defined herein, a "stop" is defined as an embarkation and a disembarkation point along the route. Stops can include three types: (i) pickup for passengers, (ii) drop-off of passengers, and (iii) picking up and dropping off passengers. Additionally stops may be classified as either "fixed stop" or an "on-demand stop." The "fixed stop" refers to those stops always serviced when a vehicle is operating along a route and the "on-demand stop" refers to those stops that may optionally be serviced when a vehicle is operating along a route.

As defined herein, an "event" is defined as a social gathering or occurrence that occurs in at least one of a scheduled time or a scheduled location. Additionally, the event may have a scheduled duration. As described herein, an event may also refer to an attraction, an activity, a conference, an exhibition, a concert, an attraction, a workplace, a party, and the like.

According to some embodiments, a method for transporting passengers in a region to an event is described. The method includes determining a tentative route for transporting the passengers to the event, where determining the tentative route includes: receiving, from at least one client device, a request from a passenger to travel to the event, where the request includes at least one of (i) a pick up location or (ii) a drop off location for the passenger, and determining event information for the event, where the event information includes at least one of (i) a time associated with the event or (ii) a location associated with the event. The method further includes determining a finalized route for transporting the passengers to the event by adjusting the tentative route, where adjusting the tentative route includes at least one of (i) determining a change in status of the tentative route or (ii) determining a geographical condition associated with the region. The method further includes publishing the finalized route to at least one database.

According to some embodiments, a method for transporting passengers in a region to an event is described. The method includes determining event information for the event, receiving shared data associated with the region, based on the shared data, establishing at least a first tentative route having a first weighted value and a second tentative route having a second weighted value. The method further includes determining whether the first weighted value is at least one of (i) greater than the second weighted value, or (ii) satisfies a condition threshold value, and in response to determining that the first weighted value is at least one of (i) greater than the second weighted value, or (ii) satisfies a condition threshold value: establishing the first tentative route as a finalized route, and publishing the finalized route to the database.

According to some embodiments, a method for establishing a finalized route for transporting passengers throughout a region to an event, is described. The method includes determining a tentative route for transporting the passengers to the event, where determining the tentative route includes: determining event information for the event that is scheduled to occur in the region, where the event information includes at least one of (i) a time associated with the event or (ii) a location associated with the event. The method further includes determining the finalized route for transporting the passengers to the event by adjusting the tentative route, where adjusting the tentative route includes at least one of (i) determining a change in status of the tentative route or (ii) determining a geographical condition associated with the region. The method further includes publishing the finalized route.

A more detailed discussion of these techniques is set forth below and described with reference to FIGS. 1-14, which illustrate detailed diagrams of systems and methods that may be used to implement these techniques. Those skilled in the art will readily appreciate that the detailed description given herein with respect to these figures is for explanatory purposes only and should not be construed as limiting.

FIG. 1 illustrates a block diagram of different computing devices that are capable of implementing the various aspects of the techniques described herein, according to some embodiments. Specifically, FIG. 1 illustrates a high-level overview of a system 100 that is configured to manage transit vehicles for transporting passengers to an event along a route. In some embodiments, the system 100 includes a transport management system 102 that is capable of receiving data from other computing devices in the system 100 (e.g., the geographic database 140, the network 150, the transit vehicle database 160, the passenger device 170-1 through 170-N, the driver device 180, etc.).

The transport management system 102 may utilize a storage device 161 to store the data that is received from the other computing devices, as described in greater detail herein. In some examples, the storage device can refer to any network-accessible memory or storage device, such as a local area network storage device, cloud networking storage device, personal area network storage device, and so forth. Although not illustrated in FIG. 1, it is understood that the transport management system 102 includes at least one processor, at least one memory, and at least one storage device that enables the transport management system 102 to implement the various techniques described herein. For example, the at least one processor, in conjunction with the at least one memory, can load instructions that are stored in the at least one storage device into the at least one memory to enable the techniques described herein to be implemented. In particular, an operating system (OS) that includes a variety of applications/kernels can be executed by the at least one processor in order to implement the various techniques described herein.

According to some embodiments, the storage device 161 includes data structures that are capable of storing the shared data from the other computing devices. In some examples, the storage device 161 may include separate databases, such as a first database that is exclusively dedicated to storing shared data that was provided by the transit vehicle database 160, and a second database that is exclusively dedicated to storing shared data that was provided by the passenger device 170-1. The data structures associated with the shared data may indicate a device identifier (device ID), a time stamp, and a data type associated with the shared data.

According to some embodiments, the shared data may be associated with the device ID that indicates a specific device that recorded the shared data. The device ID may be based upon a manufacturer number, a phone number, a subscriber identity module (SIM) card, or an internet protocol (IP) address. In some examples, the device ID is based on a user account of one or more users associated with the computing device, such as an e-mail account, a social network account, a social media account, and so forth.

According to some embodiments, the shared data received from the other computing devices may be associated with a time stamp that indicates when the shared data was recorded. In particular, the time stamp may be generated by the other computing device while recording the shared data. In some examples, the other computing device may generate (i) a beginning time stamp that indicates when the other computing device began recording the shared data, and (ii) an end time stamp that indicates when the other computing device stopped recording the shared data.

Subsequently, when the storage device 161 receives the shared data from the other computing device, the modules of the transport management system 102 (e.g., the route operation guidance module 120, etc.) may be capable of accessing the shared data, and subsequently compare an initial set of shared data having an initial time stamp to a subsequent set of shared data having a subsequent time stamp in order to determine whether to update the initial set of shared data with the subsequent set of shared data. In one example, the route operation guidance module 120 may compare the initial and subsequent time stamps of the shared data relating to an occupancy of a transit vehicle (e.g., 50% occupancy at 9:00 AM vs. 33% occupancy at 10:00 AM) to determine whether to replace and/or update the initial set of shared data with the subsequent set of shared data.

According to some embodiments, the modules of the transport management system 102 may utilize the initial time stamp of the initial set of data and the subsequent time stamp of the subsequent set of data to determine whether a transit vehicle is servicing an established route. For example, the route operation guidance module 120 may compare the initial and subsequent time stamps of the shared data relating to GPS coordinates of a transit vehicle recorded at different time stamps to determine a route traveled by the transit vehicle.

According to some embodiments, the shared data may be associated with a data type. In particular, the other computing device is capable of indicating the data type of the shared data. For example, the other computing device may indicate that the shared data is GPS coordinates associated with a transit vehicle ("7_HAIGHT"), which facilitates the route operation guidance module 120 to more seamlessly compare the shared data to other GPS coordinates associated with the transit vehicle ("7_HAIGHT").

According to some embodiments, the transport management system 102 includes a route operation guidance module 120 that is capable of receiving the shared data from the other computing devices to detect whether one or more transit vehicles are servicing an established route (and one or more stops associated with the established route). The route operation guidance module 120 is capable of receiving the shared data from the other computing devices to determine an approximate location of one or more transit vehicles within a certain confidence threshold. Subsequent to processing the received shared data, the route operation guidance module 120 is capable of determining whether the one or more transit vehicles are servicing the established route. Consider, for example, that the route operation guidance module 120 receives data (e.g., GPS coordinates) associated with at least a first location point of a transit vehicle and a second location point of the transit vehicle. Based upon the first and second location points, the route operation guidance module 120 is capable of determining whether the transit vehicle is servicing an established route to a certain confidence threshold. In some instances, the route operation guidance module 120 may utilize historical data that was received from the other computing devices such as to define the established route. According to some embodiments, the route operation guidance module 120 may utilize additional shared data received from the other computing devices in order to determine with greater confidence that the transit vehicle is servicing an established route.

Upon determining that the transit vehicle is servicing an established route, the route operation guidance module 120 is capable of determining a predictive attribute such as at least one of an estimated time schedule (e.g., estimated time of arrival (ETA), estimated time of departure (ETD)), one or more estimated stops along the established route or a sequence of stops along the established route. Thereafter, the route operation guidance module 120 is capable of transmitting the predictive attribute associated with this determination to the communication module 151. In turn, the communication module 151 may transmit the predictive attribute to the passenger device 170-1, 170-N. Additionally, the route operation guidance module 120 is capable of transmitting the predictive attribute to a route generator module 130, as will be described in greater detail herein.

Alternatively, if the route operation guidance module 120 determines that the first and second location points do not correspond to an established route, then the route operation guidance module 120 may determine whether at least one of the first or second location points correspond to a known stop associated with the established route. The known stop may be determined using historical shared data received from the other computing devices. For example, the route operation guidance module 120 may receive shared data from the network 150 (e.g., Internet) that indicates one or more known stops associated with the established route.

Subsequent to determining that at least one of the first or second location points corresponds to a known stop, the route operation guidance module 120 may establish a variant route of the established route, where the variant route and the established route share at least one common known stop—but do not share all common known stops. The variant route may be subsequently stored at the storage device 161 and relied upon by the route operation guidance module 120.

According to some embodiments, the route operation guidance module 120 is capable of managing vehicles operating along route(s) established by the transport management system 102. In particular, subsequent to the transport management system 102 pairing at least one selected operator with a finalized route and/or adjusted finalized route, the route operation guidance module 120 is capable of providing dispatch instructions and automated operations to operators. The instructions may include information such as the route to be serviced, day and time of service, real-time GPS based route navigation and guidance, wait-time instructions at a stop, real-time adjustments in the route, and passenger information. The route operation guidance module 120 is capable of establishing stops for finalized route(s) and/or adjusted finalized route(s) that have been paired up with operators. The number of stops may be dictated by the number of transit vehicles with the operator's fleet, the estimated vacancy of the transit vehicles within the operator's fleet, and/or the geographical conditions. Additionally, the route operation guidance module 120 is capable of assigning drivers to operate the transit vehicles that will be operating the finalized route(s) and/or adjusted finalized route(s).

While vehicles associated with the at least one selected operator service the route, the route operation guidance module 120 is capable of detecting if the vehicles are operating along the expected route, stops, and/or time schedule. The route operation guidance module 120 is capable of auto-detecting the actual route and actual stops using GPS data and comparing it to the expected route and expected stops.

According to some embodiments, the route operation guidance module 120 is capable of adjusting the route serviced by the vehicle associated with the at least one selected operator using live data. For example, if the vehicle is traveling along an actual route different than the expected route, then the route operation guidance module 120 is capable of substituting the actual route for the expected route.

According to some embodiments, the system 100 includes a network 150, which may refer to any network accessible memory or storage device. The network 150 may be in communication with a global system of shared computer devices (e.g., Internet). As a result, the system 100 may transit shared data that pertains to events that may be of relevance to the transport management system. In particular, the transport management system 102 may receive shared data from the network 150, where the shared data includes a time stamp, a device ID, and a data type. For example, the transport management system 102 may receive shared data that indicates an event ("TECH CRUNCH CONFERENCE") that is scheduled to occur in downtown San Francisco. The shared data includes a time stamp ("12:00 PM, AUGUST 28, 2019") that denotes when the shared data was retrieved by the network 150 and a device ID ("MOSCONE CENTER") that denotes the location of the event. Subsequently, the shared data from the network 150 may be stored at the storage device 161 to be later retrieved or utilized by the route generator module 130, as will be described herein.

According to some embodiments, the system 100 includes a transit vehicle database 160 that includes data structures for storing shared data associated with transit vehicle(s) operating in a region of interest. The shared data may be transmitted directly to the transit vehicle database 160 from one or more sensors located in the transit vehicle and/or directly from an operator associated with the transit vehicle. The shared data may include a time stamp, a device ID, and a data type. For example, the transport management system 102 may receive shared data that indicates a scheduled stop ("NORIEGA ST. & SUNSET BLVD") for a transit vehicle having a device ID ("7_HAIGHT"). The shared data further includes a time stamp ("7:00 PM, AUGUST 28, 2019") that denotes when the shared data was recorded by sensor and/or the operator. Subsequently, the shared data is transmitted from the transport vehicle database 160 to the storage device 161 to be later retrieved or utilized by the route generator module 130, as will be described herein.

According to some embodiments, the route generator module 130 may be configured to service any number of requests to generate a route based upon the shared data that is received from the other computing devices. In particular, the communication module 151 of the transit management system 102 may receive one or more requests for transportation to an event from the passenger devices 170-1 to 170-N. Each request to provide transportation to the event may include (i) a device ID associated with the passenger device 170-1, (ii) a passenger pick up location, and (ii) a passenger drop off location. In some embodiments, the route generator module 130 is configured to generate a route without having previously received a request for transportation from the passenger devices 170-1 to 170-N.

In some embodiments, the transit management system 102 may store the request for transportation at the storage device 161 until to be serviced at a later time. For example, the transit management system 102 may delay processing the request until the communication module 151 has received another request from another passenger device 170-N. In other words, the route generator module 120 may delay establishing a tentative route until a requisite number of requests have been received. In some embodiments, in response to the communication module 151 receiving the request for transportation, the communication module 151 is capable of transmitting the request to the route generator module 130. In response to receiving the request, the route generator module 130 may utilize the tentative route generator 132 to establish a tentative route for a transit vehicle to service the request for transportation.

In particular, in response to receiving the request, the tentative route generator 132 may establish a tentative route that is based on the shared data received from the other computing devices. In some instances, the shared data may be referred to as input data that is utilized by the tentative route generator 132 to establish the tentative route. For example, based on the requests received from the multiple passenger devices 170, the tentative route generator 132 is capable of determining (i) a respective passenger pick up location, and (ii) a respective passenger drop off location for each of the passengers. By utilizing the shared data received from the network 150, the transit vehicle database 160, and the passenger device 170-1, the tentative route generator 132 is capable of establishing a tentative route for transporting the passengers. As described herein, the term "tentative route" refers to a provisional route that will be later refined using additional shared data. The tentative route may be refined by additional shared data, such as shared data that indicates a geographical condition associated with the region.

According to some embodiments, the route generator module 130 includes a finalized route generator 134 that is capable of adjusting the tentative route based upon the additional shared data. In particular, the transport management system 102 solicits a request to a geographic database 140 for additional shared data pertinent to the tentative route. In response, the transport management system 102 is capable of receiving a geographical condition from the geographic database 140. The shared data including the geographical condition may also include a time stamp, a device ID, and a data type. For example, the geographical condition is at least one of (i) a traffic condition associated with the tentative route, (ii) a weather condition associated with the tentative route or (iii) an emergency notification associated with the tentative route. For example, the transport management system 102 may include shared data that indicates weather along the tentative route ("70.degree. F. LIGHT RAIN SHOWERS") and an associated time stamp ("7:30 PM, AUGUST 28, 2019"). Thereafter, the shared data is transmitted to the finalized route generator 134 that adjusts the tentative route based upon the additional shared data. Other additional data transmitted by the other computing devices, such as the network 150 and the transit vehicle database 160 may also be relied upon by the finalized route generator 134 to adjust the tentative route. It should also be noted that the tentative route generator 132, the finalized route generator 134, and the adjusted route generator 136 may be incorporated in a single generator.

According to some embodiments, the transport management system 102 includes an adjusted route generator 136 that is capable of receiving the finalized route from the finalized route generator 136. The finalized route may be further adjusted based on additional shared data so as to form an adjusted finalized route. For example, the geographical conditions shared by the geographic database 140 may alter the finalized route. In some embodiments, the functions executed by at least one of the tentative route generator 132, the finalized route generator 134 or the adjusted route generator 136 may be consolidated into a single module and/or system. For example, the transport management system 102 may include a single route generator capable of executing all of the functions of the tentative route generator 132, the finalized route generator 134, and the adjusted route generator 136.

According to some embodiments, the transport management system 102 includes an operator pairing module 141 that is capable of managing functions related to pairing the finalized route and/or the adjusted finalized route to one or more operators. The operator pairing module 141 may receive the finalized route and/or the adjusted finalized route from the route generator module 130, and subsequently publish to the network 150. As will be described herein, the network 150 includes a database having data structures for storing the route(s). The operator pairing module 141 includes a pairing operator 144 that publishes the finalized route and/or the adjusted finalized route to the database. The pairing operator 144 is capable of soliciting bid(s) from operator(s). According to some embodiments, the database is in communication with a bidding marketplace. The pairing operator 144 is capable of managing the pairing between the operator(s) and the one or more finalized route(s) and/or adjusted finalized route(s). In particular, the pairing operator 144 includes a pairing algorithm that is capable of pairing an operator to finalized route(s) and/or adjusted finalized route(s) according to a best fit. The pairing operator 144 may consider best fit factors such as the number of vehicles within the operator's fleet, the current location of the operator's drivers, the availability of the transit vehicles within the operator's fleet, and so forth. Subsequent to pairing the operator to the finalized route(s) and/or adjusted finalized route(s), the pairing operator 144 may provide data associated with the pairing to the route operation guidance module 120.

The marketplace serves as a venue for operators to openly bid on these routes. In another example, the operator pairing module 141 may provide these routes to only selected operator(s) and preemptively request that operators accept these routes so as to bypass the bidding process. In particular, the request is made to those operators having factors that match well to the needs required to execute these routes. For example, the pairing operator 144 may rely upon historical data (e.g., previous bids, previous pairings, etc.) to proactively seek out certain operators.

According to some embodiments, the transport management system 102 includes a communication module 151 that is capable of sharing data between the transport management system 102 and any one of the other computing devices (e.g., the geographic database 140, the network 150, the transit vehicle database 160, the passenger device 170-1 through 170-N, the driver device 180, etc.). Although not illustrated in FIG. 1, the communication module 151 can include various hardware components, e.g., one or more wireless communications components. In particular, the wireless communications components can include at least one of a wireless local area network (Wi-Fi) component, a wired network connection, a cellular component, an NFC component, an Ethernet component, or a Bluetooth component. According to some embodiments, data can be transmitted between the transit management system 102 and the other computing devices using any wired or wireless communications protocol.

Figure 2:
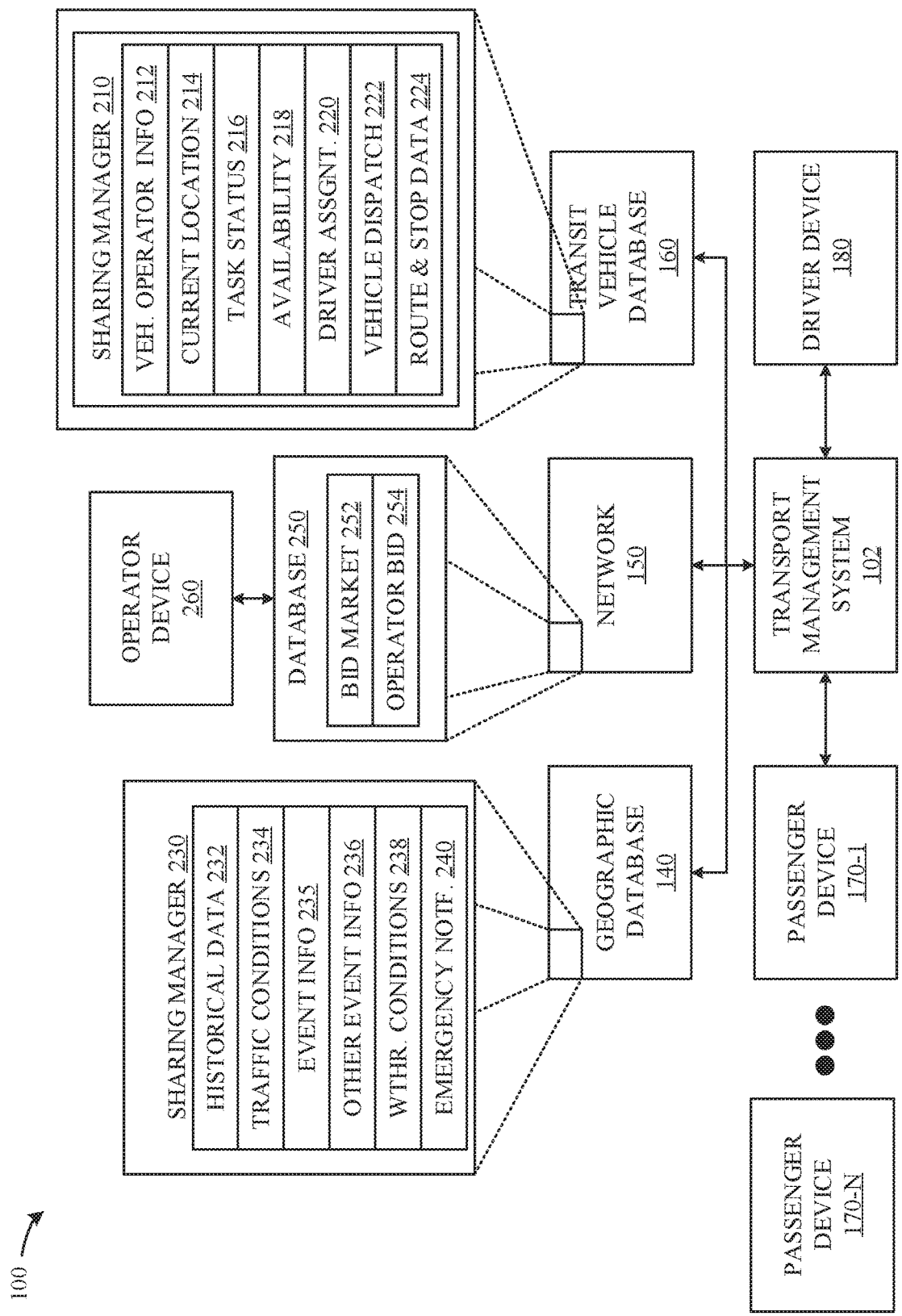

FIG. 2 illustrates a block diagram of different computing devices that are capable of implementing the various aspects of the techniques described herein, according to some embodiments. Specifically, FIG. 2 illustrates a high-level overview of the system 100 that is configured to manage transit vehicles for transporting passengers to an event along a route. In particular, FIG. 2 illustrates the geographic database 140, the network 150, and the transit vehicle database 160 that are capable of sharing data with the transport management system 102 in conjunction with managing the transportation of passengers to an event using a transit vehicle.

According to some embodiments, the system 100 includes the geographic database 140 that includes a database storing geographical data. The geographical data includes data that may indicate various geographical conditions throughout the region that are associated with the tentative route and/or the finalized route. For example, the geographical data may indicate certain traffic conditions or weather conditions associated with one or more stops along the tentative route and/or the finalized route. Indeed, geographical conditions such as weather status and traffic status may be more dynamic and likely to change than more static data such as a requested passenger pick up location or a requested passenger drop off location. Accordingly, it may be preferable to rely upon real-time or closer to real-time conditions associated with geographical conditions in order to establish the most efficient and effective finalized route possible.

According to some embodiments, the geographic database 140 includes a sharing manager 230 that is capable of sharing data between the geographic database 140 and the transport management system 102. The geographic database 140 has different types of data structures that include historical data 232, traffic conditions 234, event information 235, other event information 236, weather conditions 238, and emergency notifications 240. The aforementioned data may be shared with the transport management system 102 in conjunction with the finalized route generator 134 and the adjusted route generator 136 establishing a finalized route and an adjusted finalized route, respectively. In some embodiments, any of the aforementioned data shared with the transport management system 102 by the sharing manager 230 can be associated with a time stamp, a device ID, and a data type.

According to some embodiments, the historical data 232 includes data associated with at least one of a day of the week, a time of the day, a weather pattern during a time of the year, and so forth. For example, if the passenger device 170-1 requests a ride to ("The Bill Graham Civic Auditorium") at 7:00 PM on Friday night along Market Street, the geographic database 140 may transmit data related to traffic conditions along Market Street from historical data such as the previous Friday between 6:30-7:00 PM.

The traffic conditions 234 indicates a flow of traffic (e.g., traffic index) associated with one or more stops of the tentative route and/or the finalized route. In some examples, the traffic conditions 234 indicate a flow of traffic associated with the tentative route and/or the finalized route. In other examples, the traffic conditions 234 indicate a flow of traffic in a region proximate to the tentative route and/or the finalized route that has the capability to disrupt the flow of traffic. Consider, for example, a tentative route in San Francisco on I-280 South between 7.sup.th Street (pick up location) and Mission Street (drop off location) may be affected by traffic flow along I-101 South. Although I-101 South does not intersect I-280 between the pick up and drop off locations, I-101 South runs parallel to the tentative route and traffic on I-101 South may overflow onto I-280 South.

The event information 234 indicates an event that that the transport management system 102 is providing transportation to. For example, the transport management system 102 may crawl the geographic database 140 to determine an event that is scheduled to occur in a region. Based upon demand for the event, the transport management system 102 may dynamically generate one or more tentative route(s) to provide transportation for passengers to the event. It should be noted that the generating of the one or more route(s) does not require input from a passenger—e.g., the passenger device 170-1. In some examples, the transport management system 102 generates a tentative route based solely upon the event information 234.

The other event information 236 indicates other events that are known to be occurring at a time either prior to, overlapping with, concurrent with, or subsequent to the event that the transport management system 102 is providing transportation to. As people may be traveling to these other events, public roads and transit vehicles traveling along these public roads to the other events may impact to the travel to the requested event. In some examples, the geographic database 140 may receive data related to the other events from the network 150.

The weather conditions 238 indicates a weather condition associated with a stop along the tentative and/or finalized route or a weather condition that may affect the flow of traffic along the tentative and/or finalized routes. For example, the transport management system 102 may receive shared data from the geographic database 140 that indicates weather along the tentative route ("70.degree. F. LIGHT RAIN SHOWERS") and an associated time stamp ("7:30 PM, AUGUST 28, 2019").

The emergency notifications 240 indicates an incident in the region that is occurring at a time either prior to, overlapping with or concurrent with the event that the passenger is requesting transportation to. For example, the emergency notifications 240 may indicate a major traffic accident along the tentative and/or finalized route that may impact travel to the requested event. Other emergency notifications may include weather-related notifications (e.g., flooding, heavy rain, heat advisory, etc.) and road closures in the region.

According to some embodiments, the network 150 can include a server device, an interconnected network of computing devices, any network-accessible memory or storage device, such as a local area network storage device, cloud networking storage device, personal area network storage device, and so forth. The network 150 can include a database 250 that includes data structures for storing one or more tentative route(s), finalized route(s) and/or adjusted finalized route(s). The pairing operator 144 of the operator pairing module 141 may publish the one or more tentative route(s), finalized route(s) and/or adjusted finalized route(s) to the database 250 in conjunction with soliciting bid(s) from operator(s).

According to some embodiments, the database 250 is in communication with a bidding marketplace 252. The pairing operator 144 is capable of managing the pairing between the operator(s) and the one or more finalized route(s) and/or adjusted finalized route(s). The marketplace 252 serves as a venue for operators to openly bid on these routes. In another example, the operator pairing module 141 may provide these routes to only selected operator(s) and preemptively request that operators accept these routes so as to bypass the bidding process. In particular, the request is made to those operators having factors that match well to the needs required to execute these routes.

According to some embodiments, the transit vehicle database 160 includes a sharing manager 210 that is capable of sharing data between the transit vehicle database 160 and the transport management system 102. The transit vehicle database 210 includes different types of data structures having vehicle operator information 212, current location of a transit vehicle 214, a task status 216, availability of a transit vehicle 218, a driver assignment 220, transit vehicle dispatched 222, and route and stop data 224. The aforementioned data may be shared with the transport management system 102 in conjunction with executions of functions by the route operation guidance module 120, the route generator module 130, the operator pairing module 141, and the communication module 151. In some embodiments, any of the aforementioned data shared with the transport management system 102 by the sharing manager 210 can be associated with a time stamp, a device ID, and a data type.

According to some embodiments, the vehicle operator information 212 includes data associated with an operator that is assigned to service the finalized route and/or the adjusted finalized route with a transit vehicle. In other embodiments, the vehicle operator information 212 includes data associated with an operator that is servicing an established route. In some examples, the vehicle operator information 212 may indicate occupancy (e.g., % of vacancy) of a transit vehicle that is transporting passengers. In some examples, during the pairing process, the vehicle operator information 212 may indicate the number of transit vehicles belonging to the operator. Based upon the number of transit vehicles belonging to the operator, the pairing operator 144 may determine whether to accept a bid from the operator.

According to some embodiments, the current location 214 indicates a location of a transit vehicle that is servicing an established route, a finalized route and/or an adjusted finalized route. In some examples, the route operation guidance module 120 may utilize the current location 214 to determine whether a transit vehicle is servicing an established route. The route operation guidance module 120 may also determine the number of transit vehicles servicing an established route so that the route generator module 130 adapts accordingly. The current location 214 may be provided to a passenger—e.g., the passenger device 170-1—who requested transportation.

According to some embodiments, the task status 216 indicates whether an operator of a transit vehicle is currently servicing a task (e.g., a finalized route, etc.). For example, the pairing operator 144 may utilize the task status 216 of an operator to determine whether the operator has the capacity to fulfill a task. Additionally, the availability of a transit vehicle 218 may indicate whether an operator is available or unavailable to perform a task. In this manner, the pairing operator 144 may preemptively remove the operator from the bidding marketplace 252 as a prospective bidder before the pairing process is performed.

According to some embodiments, the driver assignment 222 indicates which of the driver(s) associated with the operator is servicing a finalized route and/or an adjusted finalized route. According to some embodiments, the transit vehicle dispatched 224 indicates a specific transit vehicle among a fleet of transit vehicles belonging to an operator that has been assigned to service a finalized route and/or adjusted finalized route.

According to some embodiments, the route and stop data 224 indicates an approximate location of one or more transit vehicles within a certain confidence threshold. The route operation guidance module 120 is capable of utilizing the route and stop data 224 to determine whether the one or more transit vehicles are servicing the established route. The route and stop data 224 may include GPS coordinates, satellite positioning, and the like. The route and stop data may be provided to the passenger device 170-1.

Although not illustrated in FIG. 2, the transit vehicle database 160 can include transit vehicle data 210 generated using various hardware components, e.g., sensor components. In particular, these sensor components may be located on the transit vehicle and/or the operators. In some examples, these sensor components can include at least one of an altitude pressure sensor, a temperature sensor, a proximity sensor, a global positioning system (GPS) sensor, an accelerometer, a gyroscope, a barometer, a passenger occupancy sensor, a counter, and so forth. In some cases, the data generated by any one of these hardware components is recorded and subsequently stored at the transit vehicle database 160.

Figure 3:
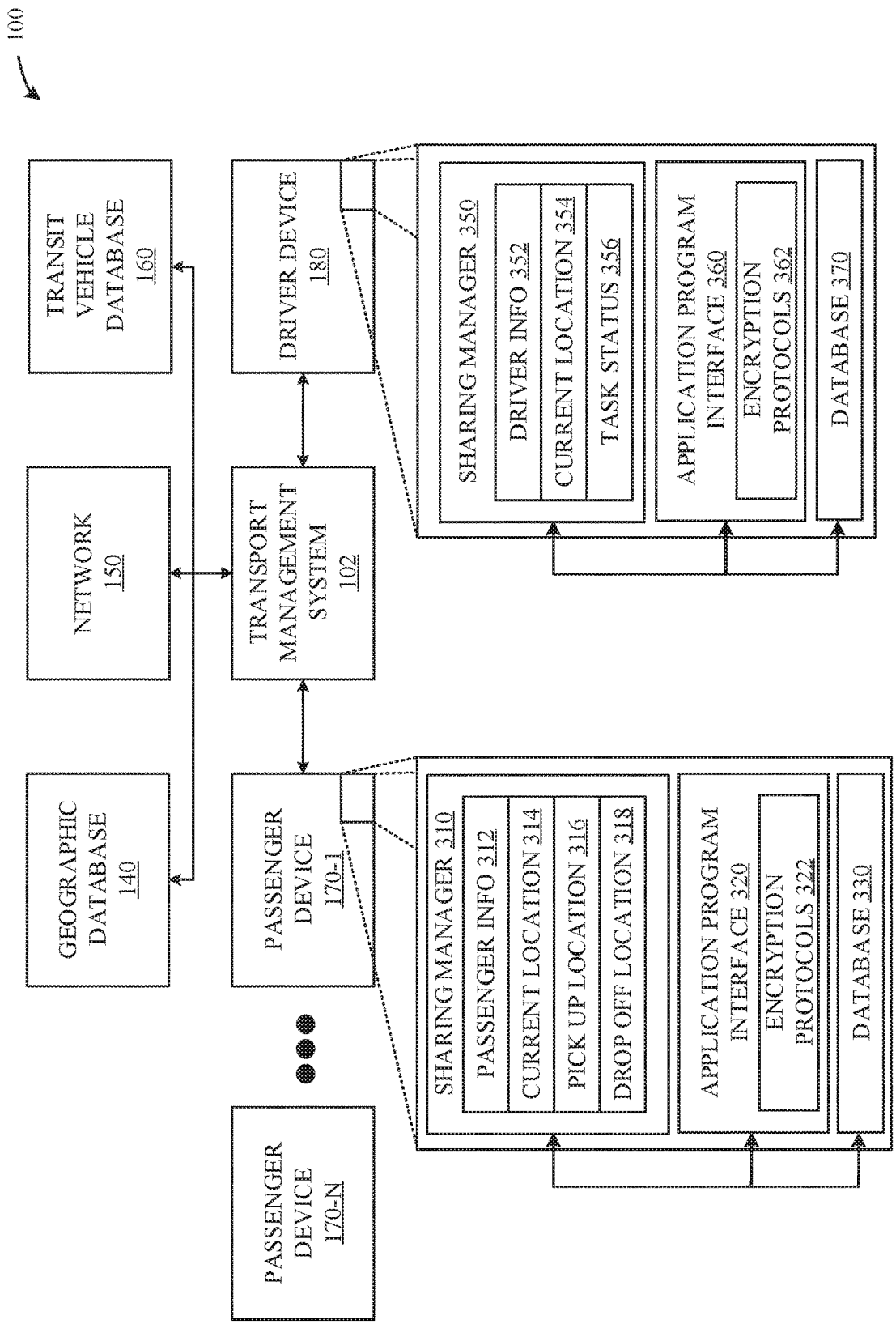

FIG. 3 illustrates a block diagram of different computing devices that are capable of implementing the various aspects of the techniques described herein, according to some embodiments. Specifically, FIG. 3 illustrates a high-level overview of the system 100 that is configured to manage transit vehicles for transporting passengers to an event along a route. In particular, FIG. 3 illustrates the passenger devices 170-1 to 170-N and the driver device 180 that are capable of sharing data with the transport management system 102 in conjunction with executing a request to transport passengers to an event using a transit vehicle. Although not illustrated in FIG. 3, the system 100 may include multiple driver devices 180 that are capable of receiving a request from the transport management system 102 to accept a task to service a transportation request.

According to some embodiments, the passenger device 170-1 includes a sharing manager 310 that is capable of sharing data between the passenger device 170-1 and the transport management system 102. The passenger device 170-1 includes a database 330 having data structures that include passenger information 310, a current location 314, a passenger pick up location 316, and a passenger drop off location 318. In particular, the passenger information 312, the current location 314, the passenger pick up location 316, and the passenger drop off location 318 can be shared with the transport management system 102 in conjunction with the passenger device 170-1 sending a request for transportation to an event. In some embodiments, any of the aforementioned data shared with the transport management system 102 by the sharing manager 310 can be associated with a time stamp. Additionally, the passenger device 170-1 is capable of receiving shared data from the transport management system 102 after a ride has been dispatch to transport the passenger to the event. The shared data includes stops, wait time, finalized route information, price, and updates (e.g., nearest stop, estimated time of arrival, etc.).

As defined herein, the passenger information 312 can include data that describes the user of the passenger device 170-1, such as a name, a user account, or a device ID. The current location 314 indicates a location of the passenger device 170-1 upon the passenger device 170-1 transmitting the request. The passenger pick up location 316 indicates a location where the passenger requests to be picked up by a transit vehicle. In some examples, the passenger pick up location 316 is different from the current location 314. The passenger drop off location 318 indicates a final destination where the passenger wants to be dropped off. The passenger device 170-1 is capable of providing a payload to the transport management system 102 that includes the aforementioned data.

According to some embodiments, the passenger device 170-1 can service requests by an application (e.g., request for transportation to an event) that is established at a memory of the passenger device 170-1 in order to access data (e.g., time stamp, passenger drop off location, device ID, etc.) that is stored at a database 330 of the passenger device 170-1. The passenger device 170-1 can include a dedicated application program interface (API) 320 for accessing data associated with requesting transportation to the event, sharing the data with the transport management system 102, and receiving data from the transport management system 102. In some cases, the API 320 can control access by the application to the data stored at the database 330 of the passenger device 170-1.

In some examples, the API 320 can establish encryption protocols for the application. According to some embodiments, the API 320 can utilize the encryption protocols 322 to implement privacy safeguards for the database 330. According to some embodiments, data that is shared between the passenger devices (e.g., passenger device 170-1 through 170-N) and the transport management system 102 can be included in a secured payload. The passenger device 170-1 can utilize the encryption protocols 322 to secure the payload via encryption keys, hashing algorithms, and other types of security protocols. In some cases, the transport management system 102 and the passenger device 170-1 can share encryption keys (e.g., using public key cryptography, symmetric keys, etc.) with one another so as to establish a secure communications channel for sharing data. In some cases, the payload generated by the passenger device 170-1 can be encrypted using the public key. Additionally, although not illustrated, the transport management system 102 may also secure data that is transmitted to the passenger device 170-1 via encryption keys, hashing algorithms, and other types of security protocols.

According to some embodiments, the driver device 180 includes a sharing manager 350 that is capable of sharing data between the driver device 180 and the transport management system 102. The driver device 180 includes a database 370 having data structures that include driver information 352, a current location 354, and a task status 356. In particular, the driver information 352, the current location 354, and the task status 356 can be shared with the transport management system 102 in conjunction with the driver device 180 receiving a request from the transport management system 102 to accept a task to service a request for transportation. In some examples, the request is initiated by the passenger device 170-1 to 170-N. Upon accepting the task, the driver device 180 may receive driving directions, a time schedule, passenger information (e.g., names, location of passengers, etc.), stop and wait time instructions, number of passengers to be transported to the event, stops along the finalized route, and the like.

As defined herein, the driver information 352 can include data that describes the user of the driver device 180, such as a name, a user account, or a device ID. The current location 354 indicates a location of the driver device 180 either in response to the driver device 180 accepting the task or periodically to provide a status of the driver device 180. The task status 356 indicates whether the driver using the driver device 180 is currently servicing a task. For example, when the driver has finished completing a task, then the driver may provide a task status notification to the transport management system 102 indicating that the delegated task has been completed. Alternatively, based upon the current location 354 of the driver device 180 and/or the current location 314 of the passenger device 170-1 may indicate that the driver is currently servicing a delegated task. In particular, if the current location 354 of the driver device 180 and/or the current location 314 of the passenger device 170-1 correspond to a finalized route generated by the finalized route generator 134 and/or an adjusted finalized route generated by the adjusted route generator 136, then the transport management system 102 may infer that the task is being performed—but not completed. The shared data provided by the driver device 180 may include a time stamp, a device ID, and a data type (e.g., current location, etc.).

According to some embodiments, the driver device 180 can service requests by an application (e.g., request for transportation to an event) that is established at a memory of the driver device 180 in order to access data (e.g., time stamp, current location, device ID, etc.) that is stored at a database 370 of the driver device 180. The driver device 180 can include a dedicated application program interface (API) 360 for providing data associated with accepting a request to provide transportation to the event. In some cases, the API 360 can control access by the application to the data stored at the database 370.

In some examples, the API 360 can establish encryption protocols for the application. According to some embodiments, the API 360 can utilize the encryption protocols 362 to implement privacy safeguards for the database 370. According to some embodiments, data that is shared between the driver device 180 and the transport management system 102 can be included in a secured payload. The driver device 180 can utilize the encryption protocols 362 to secure the payload via encryption keys, hashing algorithms, and other types of security protocols as previously described herein.

Figure 4:
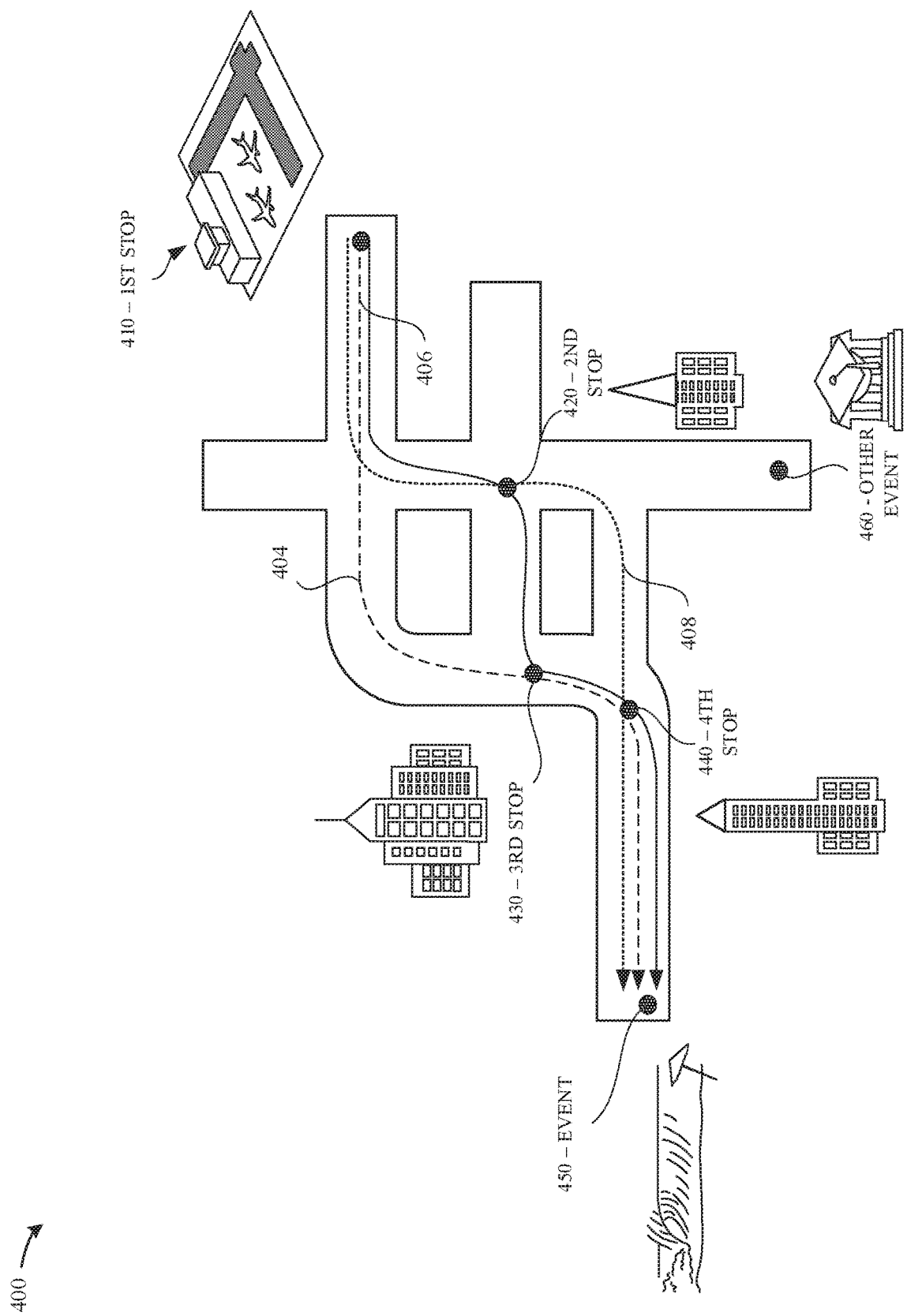
FIG. 4 illustrates an exemplary conceptual diagram of establishing a route for transporting passengers to an event, according to some embodiments.

FIG. 4 illustrates an exemplary diagram for automatically establishing a route throughout a region as executed by the transport management system 102, according to some embodiments. As defined herein, the region may be a state, a county, a city, a town, a municipality or any portion thereof. The region may include intra-city and inter-city travel. The region may include inter-state and intra-state travel. The region is greater than a route that traverses through the region as the route corresponds to a link between two or more points within the region. For purposes of the exemplary diagram, FIG. 4 refers to a region ("SAN FRANCISCO") and various routes that traverse throughout the region.

FIG. 4 illustrates an exemplary diagram of a region 400, according to some embodiments. According to some embodiments, the transport management system 102 is capable of establishing a route to an event 450 ("OCEAN BEACH SURF CONTEST") scheduled to start at ("2:00 PM") in response to receiving a request from at least one passenger for transportation to the event 450. For example, as illustrated in FIG. 4, a first passenger may request pickup from a 1ST STOP 410 ("SAN FRANCISCO INTERNATIONAL AIRPORT") and requesting transportation to the event 450. Additionally, a second passenger may request pickup from a 3RD STOP 430 ("FAIRMONT HOTEL"). Additionally, a third passenger may request pickup from a 4TH STOP 440 ("RITZ-CARLTON HOTEL"). The route generator module 130 is capable of establishing a tentative first route 404 that encompasses stops for satisfying the requested stops. However, the tentative first route 404 does not consolidate one or more other nearby hotels along the route for the purpose of maximizing the number of passengers to the event 450.

Instead the transport management system 102 is capable of establishing a tentative second route 406 by crawling the shared data of the geographic database 140 to determine attendees that are scheduled to attend the event 450—who did not request for transportation to the event 450. For example, the route generator module 130 is capable of searching the databases of hotels throughout the region 400 and determining a list of attendees who have tickets to the event 450. Additionally, the route generator module 130 is capable of generating a route to the event that includes stop(s) at one or more hotels having attendees that plan to attend the event 450. As described with reference to FIG. 4, passengers who plan to attend the event 450 are staying at the 2ND STOP 420 ("WESTIN HOTEL"). The route generator module 130 is capable of detecting a large number of attendees that plan to attend to the event 450 are staying at the 2ND STOP 420. In response, the route generator module 130 establishes a tentative second route 406 in order to pick up additional passengers at the 1.sup.ST STOP 420. It should be noted that the route generator module 130 establish this stop not based upon a request from a passenger—but instead by collecting and analyzing shared data provided by other computing devices in the system 100.

The transport management system 102 is capable of crawling the shared data of the geographic database 140 to determine other event information 236 that is occurring in the region 400 either prior to, concurrent, or subsequent to the occurrence of the event 450 in conjunction with establishing a route to the event 450. For example, the route generator module 130 is capable of crawling the Internet to determine other events, activities, conferences, and the like that are occurring. As illustrated in FIG. 4, a graduation ceremony at a local university ("UNIVERSITY OF CALIFORNIA—SAN FRANCISCO") is scheduled to occur at ("1:00 PM") prior to the event 450. The route generator module 130 is capable of identifying other event information associated with the other event 460, such as the number of students that will graduate during the graduation ceremony, the capacity of the auditorium scheduled to host the graduation ceremony, the expected attendance of the graduation ceremony, traffic information associated with routes in proximity to the graduation ceremony, and the like. For example, based upon the other event information, the route generator module 130 is capable of establishing that traffic along a route ("HIGHWAY 280 NORTH") in proximity to the other event 460 has medium traffic, but is expected to become more congested. Based upon the expected congestion, the route generator module 130 may avoid establishing a route along the tentative third route 408 although the third route 408 would include the 1ST, 2ND, 3RD, 4TH STOPS 410, 420, 430, 440 and would also represent the most direct and fastest route to reaching the event 450. Alternatively, the route generator module 130 may establish a route that services the event 450 and the other event 460. In particular, the transport management system 102 is capable of identifying the other event 460 as having a demand for transportation.

In addition, the route generator module 130 is capable of analyzing the shared data at the geographic database 140 to assess weather conditions 238 occurring in the region 400. For example, as illustrated in FIG. 4, the route generator module 130 determines that heavy rain is falling along portions of the tentative third route 408. The weather conditions 238 may impact the flow of traffic along the tentative third route 408. As a result, the route generator module 130 may also avoid establishing a route along the tentative third route 408.

Accordingly, in assessing the tentative first, second, and third routes 404, 406, 408, the route generator module 130, the route generator module 130 establishes a route that corresponds to the second route 406 for transporting passengers to the event 450. According to some embodiments, the transport management system 102 is capable of establishing a route to an event 450 without having received any request from a passenger for transportation to the event 450. In other words, the tentative first, second, and third routes 404, 406, 408 are generated solely upon the route generator module 130 analyzing data that is shared by the other computing devices. In some examples, the route generator module 130 selects from one or more tentative routes based upon a condition threshold being satisfied.

Notably, the techniques described herein for generating one or more tentative route(s) and/or selecting a route from the one or more tentative route(s) is based out of necessity due to there being no established routes. Additionally, the factors considered by the route generator module 130 takes place quickly—e.g., in the matter of a few seconds up to a few minutes instead of hours or even days. In contrast, demand-responsive transport systems utilize fixed routes that are based upon a schedule. Moreover, fixed routes are not adaptable and are created in a vacuum (i.e., do not consider other events that are occurring). Additionally, transportation network company ride services establish routes for passengers based solely upon a requested pickup location and a drop off location. In other words, the route is established based on stops provided by the passengers. In contrast, the techniques described herein involve generating route(s) between different stops where no established route was previously known. This is due at least in part because the route(s) are continually being altered or updated due to more recent information that becomes available to the transport management system 102.

Moreover, utilizing the techniques described herein, the passengers being transported to the event 450 may discover new routes that were generated by the transport management system 102 and use these routes for their own personal use. Beneficially, the techniques described herein enable for passengers to continually discover new routes due to the transport management system 102 being continually updated with shared data from the other computing devices. Indeed, in some instances, because these routes were not previously established and/or known prior to being generated by the transport management system 102, the transport management system 102 is capable of publishing or notifying the passengers of the tentative route and/or finalized route such as to provide these passengers with more travel options. Moreover, these routes may also be published to the general public (i.e., non-passengers).

Figure 5A:
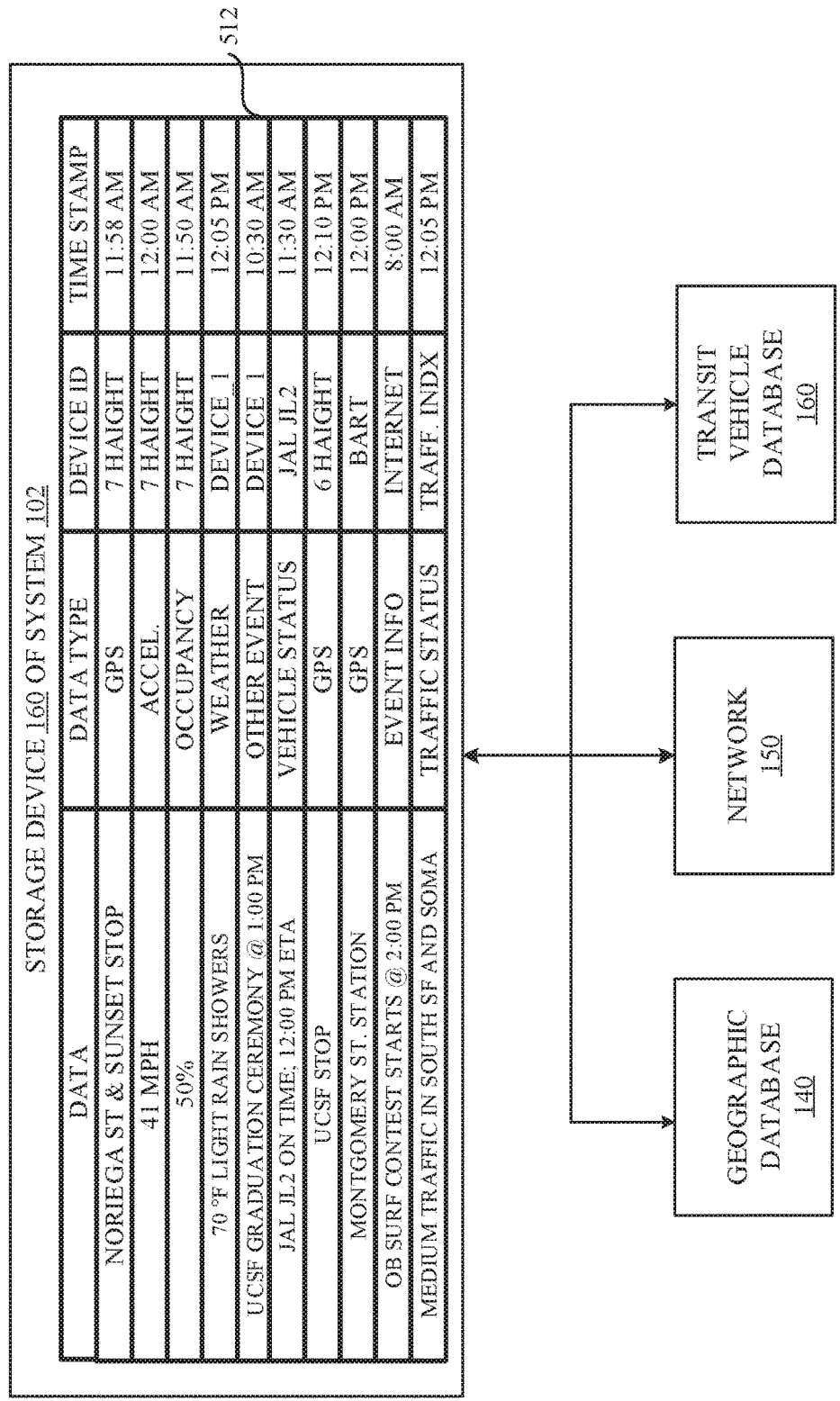

FIGS. 5A-5E illustrate conceptual diagrams of the transport management system 102 servicing a request to provide transportation to passengers to an event, according to some embodiments. Specifically, FIG. 5A illustrates a conceptual diagram 510 of an example scenario in which the transport management system 102 receives shared data 512 from the other computing devices—e.g., the geographic database 140, the network 150, and the transit vehicle database 160. As previously described herein, the transport management system 102 is capable of utilizing the shared data 512 to service one or more requests to provide transportation for passengers to an event ("OB SURF CONTEST STARTS @ 2:00 PM"). The event is a surfing contest at Ocean Beach, San Francisco. In some embodiments, the shared data received from the other computing devices is stored at a storage device 161.

According to some embodiments, the step 510 may be preceded by the transport management system 102 receiving the shared data 512 from these other computing devices at different time intervals, and subsequently storing the shared data 512 at a database of the storage device 161. In some examples, the shared data may be received in conjunction with the transport management system 102 servicing one or more requests to provide transportation for passengers to an event. In some examples, the requests are provided by the passengers—e.g., the passenger device 170-1 or provided by the transport management system 102 in response to receiving shared data.

As illustrated in FIG. 5A, the shared data 512 received from the other computing devices can include base data ("NORIEGA ST & SUNSET STOP") and the following associated data: ("DATA TYPE: GPS," "DEVICE ID: "7_HAIGHT") and "TIME STAMP: 11:58 AM"). In this example, the time stamp ("TIME STAMP: 11:58 AM") can represent the time period of when a GPS sensor of the transit vehicle identified as ("7_HAIGHT") recorded GPS coordinates of the transit vehicle. As previously described herein, the data associated with the GPS coordinates of the transit vehicle ("7_HAIGHT") may be transmitted to the transport vehicle database 160. Thereafter, the transport vehicle database 160 may transmit the data ("NORIEGA ST & SUNSET STOP") and its associated data to the transport management system 102. The aforementioned types of associated data described herein are merely examples, and do not represent an exhaustive list of the different types of associated data that describe the base data.

As illustrated in FIG. 5A, the first step 510 can involve the transport management system 102 receiving the shared data 512 from the other computing devices via a payload. Each of the other computing devices—e.g., the geographic database 140, the network 150, and the transit vehicle database 160—are capable of providing a different payload to the transport management system 102.

As illustrated in FIG. 5A, the shared data 512 received from the other computing devices may be utilized to provide transportation to an event. In particular, the shared data 512 may include different types of data, such as availability of a transit vehicle 218 that indicates a current occupancy ("50%") of the transit vehicle ("7_HAIGHT") at a time stamp ("11:50 AM"). Additionally, the shared data 512 may include route and stop data 224 that indicates a base data of an airplane flight estimated to arrive at San Francisco Airport ("JAL JL2 ON TIME: 12:00 PM ETA") having an associated time stamp ("11:30 AM"). Additionally, the shared data 512 may include other event information 236 that indicates a base data of another event, a graduate school ceremony ("UCSF GRADUATION CEREMONY @ 1:00 PM"), that is scheduled to occur prior to the event ("OB SURF CONTEST STARTS @ 2:00 PM"). The other examples of shared data illustrated in FIG. 5A are intended to describe different types of shared data that may affect the means and the manner in which to transport passengers to the event.

Figure 5B:
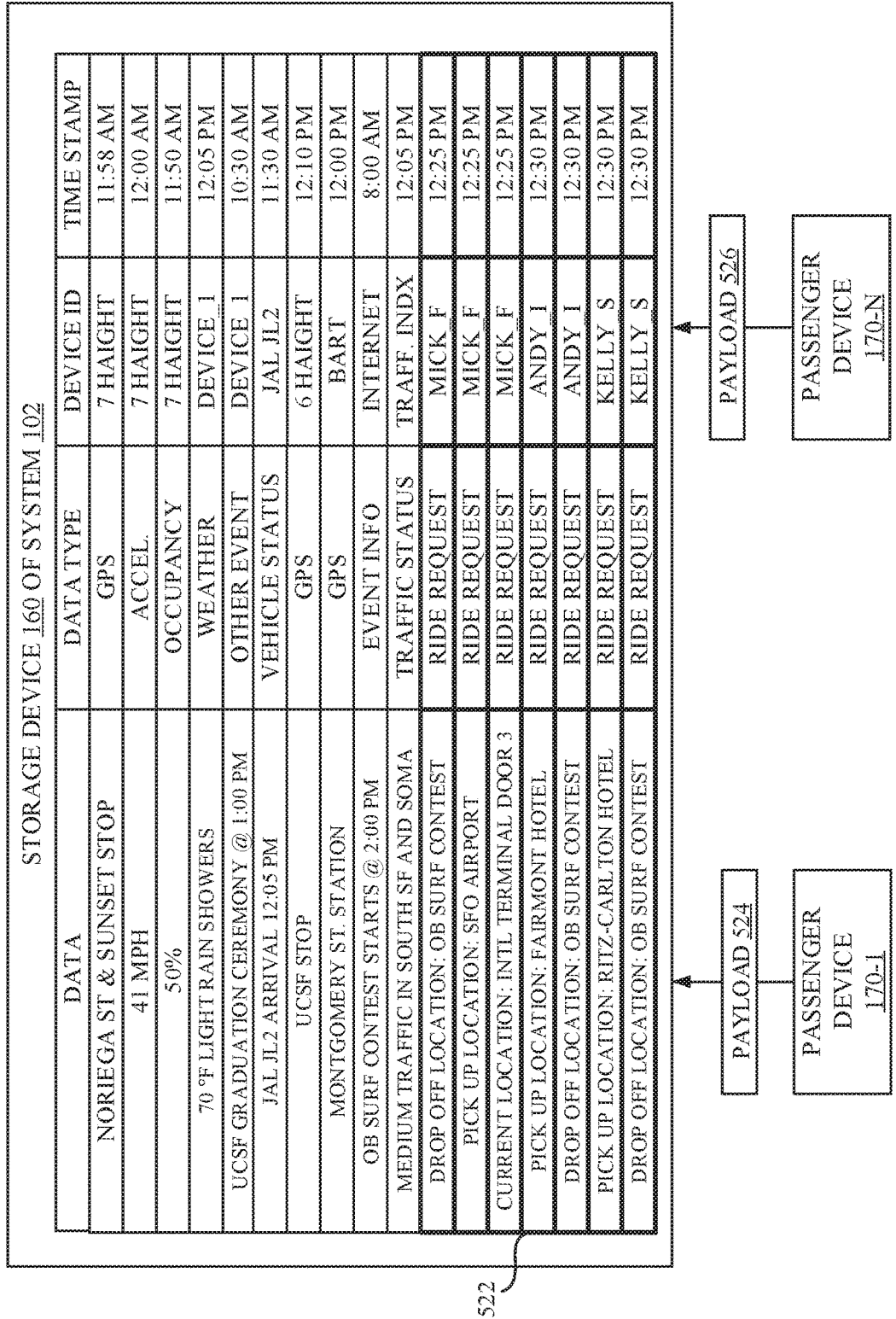

As illustrated in FIG. 5B, a second step 520 can involve the transport management system 102 receiving requests from passenger devices 170-1 to 170-N to service a request to provide transportation to events. According to some embodiments, the step 520 may be preceded by users of the passenger devices 170-1 to 170-N initiating requests to provide transportation. In this example, the communication module 151 of the transport management system 102 may receive a first request via a payload 524 from the passenger device 170-1. Additionally, the communication module 151 of the transport management system 102 may receive a second request via a payload 526 from the passenger device 170-N. Although not illustrated in FIG. 5B, any number of requests may be received and processed by the transport management system.

As illustrated in FIG. 5B, the second step 520 can involve the transport management system 102 receiving shared data 522 from the passenger devices 170-1 to 170-N. The shared data 522 may be transmitted in the form of payloads 524, 526 from the passenger devices 170-1, 170-N. The payload 524 can include base data of passenger information 312 ("MICK_F"), a current location 314 ("SFO INTERNATIONAL TERMINAL DOOR 3"), a passenger pick up location 316 ("SFO AIRPORT"), and a passenger drop off location 318 ("OB SURF CONTEST"). The base data includes a request to provide transportation for the passenger ("MICK_F") to the event ("OB SURF CONTEST STARTS @ 2:00 PM") and associated data that includes a time stamp ("12:25 PM"). The payload 526 may be received by the transport management system 102 at a different time than the payload 524. The payload 526 can include base data of passenger information 312 ("ANDY_I"), a passenger pick up location 316 ("FAIRMONT HOTEL"), and a passenger drop off location 318 (OB SURF CONTEST") and associated data that includes a time stamp ("12:30 PM"). Another payload not illustrated in FIG. 5B can include base data of passenger information 312 ("KELLY_S"), a passenger pick up location 316 ("RITZ-CARLTON HOTEL"), a passenger drop off location 318 ("OB SURF CONTEST"), and associated data that includes a time stamp ("12:30 PM"). It should be noted that the passenger pick up location 316 between passenger ("MICK_F"), passenger ("ANDY_I"), and passenger ("KELLY_S") are different.

As illustrated in FIG. 5C, a third step 530 can involve the transport management system 102 generating a tentative route based on the shared data received from the other computing devices—e.g., the geographic database 140, the network 150, the transit vehicle database 160, the passenger device 170-1—according to some embodiments. Prior to generating the tentative route, the transport management system 102 receives event information 235 from the geographic database that indicates ("17 ATTENDEES STAYING AT WESTIN HOTEL"). In other words, seventeen attendees of the event are staying at the ("WESTIN HOTEL") and will likely require transportation to the event. Accordingly, the transport management system 102 is capable of generating an automated stop 534 ("WESTIN HOTEL") to accommodate for these attendees to the event.

In response to receiving the shared data, the tentative route generator 132 of the transport management system 102 is capable of generating a tentative route 532 that encompasses the passenger pick up locations, the passenger drop off locations, current locations of the passengers ("MICK_F", "ANDY_I", "KELLY_S"), and the automated stop 534 ("WESTIN HOTEL"). Subsequently, the tentative route generator 132 establishes a tentative route 532 that involves a 1.sup.st stop ("SFO AIRPORT"), a 2.sup.nd stop ("WESTIN HOTEL"), a 3.sup.rd stop ("FAIRMONT HOTEL"), 4.sup.th stop ("RITZ-CARLTON HOTEL"), and a final stop at the event ("OCEAN BEACH—NORIEGA ST").

Furthermore, the tentative route 532 may be based off the shared data 512 received from the other computing devices. For example, the tentative route generator 132 may consider the route and stop data 224 of the Bay Area Rapid Transit train ("BART") having GPS coordinates of ("MONTGOMERY ST. STATION") at time stamp ("12:00 PM"). Furthermore, the tentative route generator 132 may consider the traffic conditions 234 ("MEDIUM TRAFFIC IN SOUTH SF AND SOMA") and the other event information 236 ("UCSF GRADUATION CEREMONY @ 1:00 PM") having its own associated traffic so that the tentative route 532 avoids these traffic conditions. Additionally, the tentative route 532 may be based off the route and stop data 224 of a transit vehicle ("7_HAIGHT"), and a current occupancy ("50%") of the transit vehicle ("7_HAIGHT") at a time stamp ("11:50 AM"). In particular, the ("7_HAIGHT") is also scheduled to stop at ("OCEAN BEACH—NORIEGA ST"). Based upon the current occupancy ("50%") of the transit vehicle ("7_HAIGHT"), the tentative route generator 132 may reduce the number of transit vehicles to service passengers along the tentative route as there is not significant demand of people traveling to ("OCEAN BEACH—NORIEGA ST"). However, if the current occupancy of the transit vehicle increases, then the finalized route generator 134 may increase the number of transit vehicles to service passengers, as will be described in greater detail with reference to FIG. 5D.

According to some embodiments, FIG. 5D illustrates a fourth step 540 that represents the transport management system 102 generating a finalized route based on the shared data received from the other computing devices—e.g., the geographic database 140, the network 150, the transit vehicle database 160, the passenger device 170-1. As previously described herein, the transport management system 102 may receive additional shared data 542 from any one of the other computing devices. However, it should be noted that the transport management system 102 is capable of placing a greater amount of weighted value upon additional shared data 542 that indicate geographical conditions than other base data. In particular, geographical conditions such as a weather status and a traffic status are more dynamic and likely to change than more static base data such as a requested passenger pick up location or a requested passenger drop off location or other event information. Thus, it may be preferable to utilize geographical conditions recorded as close to real-time as possible.

Although not illustrated with reference to FIG. 5C, the transport management system 102 is also capable of finalizing the tentative route if there is a change in status of the tentative route. Consider, that the tentative route is dormant and inactive until at least one selected operator is paired with the tentative route. Accordingly, a change in status of the tentative route may occur when at least one operator is paired with the tentative route. Additionally, a change in status may occur if a passenger—e.g., the passenger ("MICK_F") discovers the tentative route and wants to utilize the tentative route as transportation to the event. Due to demand from one or more passengers for the tentative route, the transport management system 102 is capable of finalizing the tentative route.

As illustrated in FIG. 5D, the transport management system 102 receive additional shared data 542 from the geographic database 140 and the transit vehicle database 160. In particular, the additional shared data 542 includes traffic conditions 234 ("MAJOR TRAFFIC ACCIDENT ON 101 N @ 6.sup.th ST") having an associated time stamp ("12:47 PM") as provided by the geographic database 140. Moreover, the additional shared data 542 includes availability of a transit vehicle 218 having a current occupancy ("88%") of the transit vehicle ("7_HAIGHT") at a time stamp ("12:49 PM") as provided by the transit vehicle database 160. The finalized route generator 134 is capable of considering both additional shared data 542, but placing a greater amount of weighted value upon the traffic conditions 234 instead of the availability of a transit vehicle 218. For example, the finalized route generator 134 may place 70% weight on the traffic conditions 234 and only 30% weight on the availability of a transit vehicle 218.

As illustrated in FIG. 5D, the finalized route generator 134 accounts for the traffic conditions 234 ("MAJOR TRAFFIC ACCIDENT ON 101 N @ 6.sup.th ST") to adjust the time schedule for the transit vehicle ("BUS #1") assigned to service the finalized route 544. As illustrated in FIG. 5D, the finalized route 544 pushes the 1.sup.st stop time from ("12:50 PM") to ("12:55 PM"), the 2.sup.nd stop time from ("1:15 PM") to ("1:20 PM"), the 3rd stop time from ("1:25 PM") to ("1:30 PM"), the 4.sup.th stop time from ("1:35 PM") to ("1:45 PM") and the last stop time from ("1:45 PM") to ("1:55 PM").

According to some embodiments, FIG. 5E illustrates a fifth step 550 that represents the transport management system 102 generating multiple finalized routes based on the shared data received from the other computing devices—e.g., the geographic database 140, the network 150, the transit vehicle database 160, the passenger device 170-1. In particular, FIG. 5E illustrates the finalized route generator 134 adjusts the tentative route 532 to form the finalized route 544 by using the additional shared data 542. In particular, as the current occupancy of the transit vehicle ("7_HAIGHT") has increased from ("50% CAPACITY") to ("88% CAPACITY"), the finalized route generator 134 may either require more vehicles that are needed to service the finalized route 544 and/or establish multiple routes instead of a single route in order to service the demand from more passengers to travel to the event. In particular, the finalized route generator 134 is capable of inferring that there is an increased demand of passengers attending the event ("OB SURF CONTEST STARTS @ 2:00 PM"), and thereby add finalized routes 552, 554, 556 that are similar to the finalized route 544 with an increased number of transit vehicles servicing the finalized route 544 to accommodate for an anticipated demand of requests from passengers to attend the event. Each of the finalized routes 552, 554, 556 is serviced by a different transit vehicle ("LINE 1," "LINE 2," and "LINE 3") according to a different time schedule.

Subsequent to generating the finalized routes 552, 554, 556, the finalized route generator 134 is capable of transmitting the finalized routes 552, 554, 556 to the pairing operator 144 of the operator pairing module 141. Thereafter, the pairing operator 144 is capable of publishing the finalized routes 552, 554, 556 to the database 250. The finalized routes 552, 554, 556 may be stored at the database 250 until the pairing operator 144 provides instructions to the network 150 that causes the finalized routes 552, 554, 556 to be published at the bidding marketplace 252. The bidding marketplace 252 may be representative of data structures of the database 250. The operator pairing module 141 is capable of soliciting and receiving requests from operators to operate one or more of these finalized routes 552, 556, 556, as will be described in greater detail with reference to FIGS. 6A-6B.

FIGS. 6A-6B illustrate example conceptual diagrams of pairing one or more finalized routes with one or more operators, according to some embodiments. Specifically, FIG. 6A illustrates that the finalized routes 552, 554, 556 are published to the bidding marketplace 252 by the pairing operator 144. Once published to the bidding marketplace 252, the pairing operator 144 may solicit bids from the operator device 260. Thereafter, the network 150 is capable of receiving at least one operator bid 254 from the operator device 260. The operator bid 254 may be stored at the database 250, and subsequently reviewed by the pairing operator 144. In some embodiments, the operator bids 254 may refer to updated bid data received from the operator device 260. The updated bid data may replace and/or add to previously received bid data associated with the at least one operator bid 254. The bidding process may set for the future (e.g., hours, day, months, etc.) ahead of the event. Alternatively, the bidding process may be set in real-time during and/or concurrent with the event.

Specifically, FIG. 6A illustrates multiple bids 612, 614, 616 received from different operators—e.g., the operator device 260. Each of the bids 612, 614, 616 includes shared data having a name of the operator that provided the bid ("OPERATOR"), number of the finalized routes that can be serviced by the operator ("SERVICE"), a cost of the bid submitted by the operator ("COST"), number of vehicles in the fleet ("FLEET"), a rating ("RATING"), and a status of the bid submitted by the operator ("BID STATUS"), which may be considered factors that are assessed by the pairing operator 144. The pairing operator 144 may assess each bid received based on these multiple factors. Other factors for assessing a bid may include space availability, passenger safety rating, etc.

As illustrated in FIG. 6A, the bid 612 was received from the operator ("PACIFIC NORTHWEST TRANSPORT COMPANY") to service ("LINES 1-3"), having ("3 BUSES") in its fleet, a rating ("4.5 STARS"). The bid 614 was received from the operator ("CALIFORNIA FUN TRANSPORT COMPANY") to service ("LINES 1-3"), having ("5 BUSES") in its fleet, a rating ("4.7 STARS"). The bid 616 was received from the operator ("ALL DAY TRANSPORT COMPANY") to service ("LINES 2-3"), having ("2 BUSES") in its fleet, and a rating ("3.9 STARS"). As illustrated in FIG. 6A, the status of each of the bids 612, 614, 616 is pending. In other words, none of the bids 612, 614, 616 have been accepted by the pairing operator 144.

The pairing operator 144 includes a pairing algorithm that is capable of pairing an operator to one or more of the finalized routes 552, 554, 556 according to a best fit. The pairing operator 144 may consider best fit factors such as the number of vehicles within the operator's fleet, the cost of the bid, the rating of the operator, and so forth. Although not illustrated in FIG. 6A, an operator device 260 may solicit a bid to one or more of the finalized routes and/or adjusted finalized routes. In other words, the operator device 260 does not have to solicit a bid for all of the routes published to the bidding marketplace 252.

According to some embodiments, instead of the pairing operator 144 soliciting bids from one or more operators for the finalized routes 552, 554, 556 as described above, the pairing operator 144 is also capable of preemptively bypassing the bidding process and sending a direct request to one or more operators—e.g., the operator device 260—to service one or more of the finalized routes 552, 554, 556. For example, the pairing operator 144 may seek out operators who have a history of soliciting bids at the bidding marketplace 252, successfully servicing previous finalized routes, and so forth.

Specifically, FIG. 6B illustrates that the pairing operator 144 accepts the bid 614 from the operator ("CALIFORNIA FUN TRANSPORT COMPANY") over the other bids 612, 616. As previously described herein, the pairing operator 144 may accept a bid from an operator according to a best fit of a variety of factors. In some examples, certain factors may be more heavily weighted than other factors. For example, the rating may be assigned a greater weighted value than the cost of the bid. Once the bid 614 is accepted by the pairing operator 144, the pairing operator 144 is capable of providing a notification to the operator device 260 associated with the bid 614 that was accepted. Additionally, the pairing operator 144 is capable of providing a notification to the operator device 260 associated with the bids 612, 616 that were declined. The acceptance of the bid 614 causes the pairing operator 144 to pair the bid 614 with the operator device 260 associated with the bid 614.

Subsequent to pairing the operator ("CALIFORNIA FUN TRANSPORT COMPANY") to the finalized routes 552, 554, 556, the pairing operator 144 may provide data associated with the pairing to the route operation guidance module 120. The route operation guidance module 120 is capable of providing notifications to the passenger devices 170-1 to 170-N that requested the transportation. In particular, the notifications can include the finalized routes 552, 554, 556 and associated passenger pick up location, stops, last stop, time schedules, the operator, an identification of the transit vehicle servicing the request for transportation, and the like. Additionally, the route operation guidance module 120 is capable of providing one or more requests to the at least one driver device 180 to service the request. In particular, the request includes a task for the driver associated with the driver device 180. In turn, the driver device 180 is capable of accepting or denying the request for the task, as will be described in greater detail herein. For example, the task may include a job fee. The driver device 180 may provide a request to accept the job based on the job fee.

Figure 7:
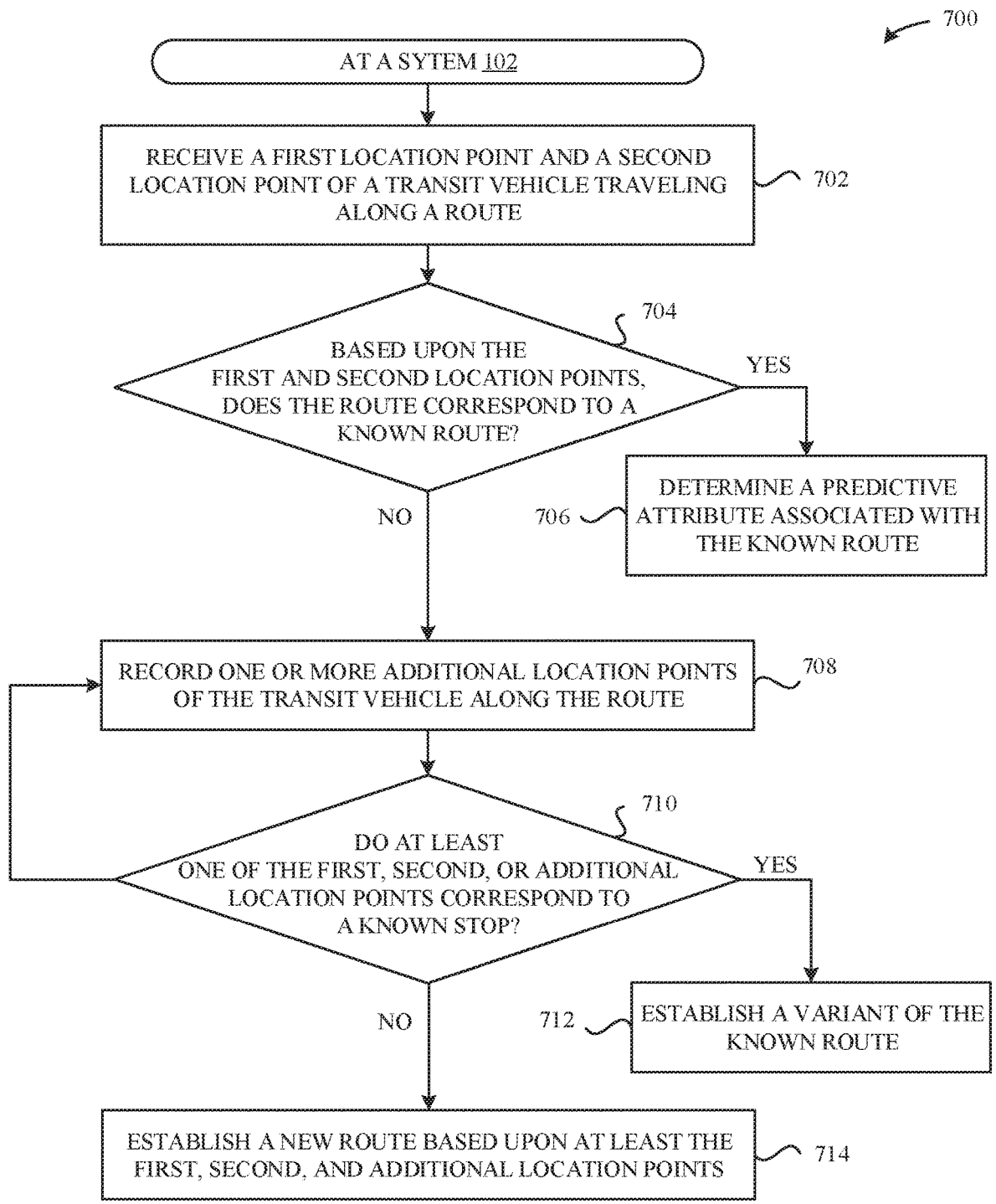
FIG. 7 illustrates a method for detecting and learning a route, according to some embodiments.

FIG. 7 illustrates a method 700 executed by the transport management system 102 for detecting and learning a route, according to some embodiments. According to some examples, the route operation guidance module 120 of the transport management system 102 is capable of managing vehicles operating along route(s) generated by the transport management system 102. In particular, subsequent to the transport management system 102 pairing at least one selected operator with a finalized route and/or adjusted finalized route (as described in more detail with reference to FIGS. 8-13), the route operation guidance module 120 is capable of providing dispatch instructions and automated operations to operators. The instructions may include information such as the route to be serviced, day and time of service, real-time GPS based route navigation and guidance, wait-time instructions at a stop, real-time adjustments in the route, and passenger information.

As illustrated in FIG. 7, the method 700 begins at step 702, where the transport management system 102 receives at least a first location point (e.g., GPS coordinates) and a second location point of a transit vehicle traveling along a route. In some examples, the first and second location points may be transmitted by a sensor onboard the transit vehicle (e.g., GPS sensor, accelerometer, cellular signal, etc.). In some examples, the first and second location points may be stored at the transit vehicle database 160 and/or the storage device 161. As transit vehicles associated with the at least one selected operator service the route (e.g., the finalized route, the adjusted finalized route, etc.), the route operation guidance module 120 is capable of detecting if the transit vehicles are operating along the expected route, expected stops, and/or expected time schedule. The route operation guidance module 120 is capable of auto-detecting the actual route and actual stops using GPS data and comparing it to the expected route and expected stops. For example, the route operation guidance module 120 is capable of determining if the transit vehicle servicing the route has an issue (e.g., mechanical breakdown, driver emergency, etc.). In response to determining that there is an issue, the route operation guidance module 120 may ensure that the issue is addressed (e.g., shuttle servicing the passengers in the event of a mechanical breakdown, etc.)

At step 704, the route operation guidance module 120 determines whether the first and second location points correspond to a known route. In some examples, the known route was previously stored at a database of the storage device 161. In some examples, the known route may refer to an established route, a finalized route, and/or an adjusted finalized route.

At step 706, in response to determining that the first and second location points correspond to the known route, the route operation guidance module 120 determines a predictive attribute associated with the known route. For example, the predictive attribute can include at least one of a time schedule, a last stop, or a sequence of stops.

Returning back to step 704, if the first and second location points do not correspond to the known route, then the route operation guidance module 120 records one or more additional location points provided by the transit vehicle along the route, as indicated at step 708. Notably, the one or more additional location points may be utilized by the route operation guidance module 120 to determine if the transit vehicle is traveling along an entirely new route or a variant of a known route.

At step 710, the route operation guidance module 120 determines whether one of the first, second, or one or more additional location points correspond to a known stop.

At step 712, in response to determining that at least one of the first, second, or one or more additional location points correspond to a known stop, the route operation guidance module 120 establishes a variant of the known route. In some examples, the variant of the established route has at least one stop in common with the known route and does not share all of the stops with the known route. In other words, the finalized route and/or adjusted finalized route may be substituted with the variant of the known route. In some embodiments, subsequent to generating the variant of the known route, the route operation guidance module 120 is capable of determining whether the transit vehicle is following the variant of the known route.

Returning back to step 714, if none of the first, second, and one or more additional location points do not correspond to a known stop, then the route operation guidance module 120 generates a new route. In some examples, the new route does not share any stops with the known route. According to some embodiments, the route operation guidance module 120 is capable of adjusting the route serviced by the transit vehicle associated with the at least one selected operator using live data. For example, if the transit vehicle is traveling along an actual route different than the expected route, then the route operation guidance module 120 is capable of substituting the actual route for the expected route. In other words, the finalized route and/or adjusted finalized route may be substituted with the new route.

Figure 8:
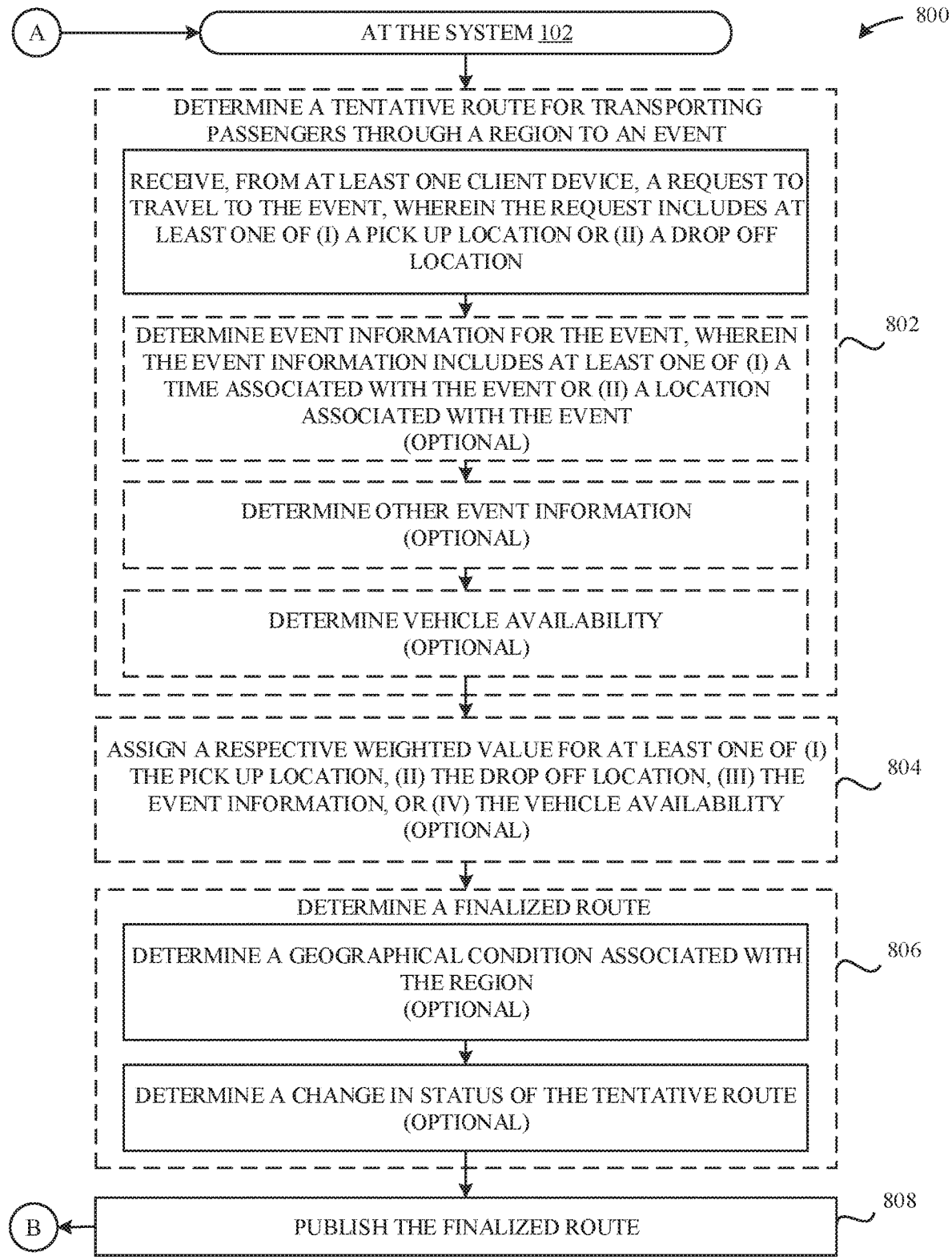
FIG. 8 illustrates a method for establishing a finalized route, according to some embodiments.

FIG. 8 illustrates a method executed by the transport management system 102 for establishing a finalized route, according to some embodiments. As illustrated in FIG. 8, the method 800 begins at step 802, where the transport management system 102 determines a tentative route for transporting passengers through a region to an event. In some embodiments, the tentative route generator 132 generates the tentative route in response to receiving one or more requests from passengers requesting transportation to the event. Consider, for example, that the first passenger requests transportation to an event at the "San Francisco City Hall" and the second passenger requests transportation to an event at the "Bill Graham Civic Auditorium." Both of these facilities are located in the Civic Center neighborhood in San Francisco. According to some embodiments, the establishing of the finalized route may be executed by the finalized route generator 134 of the transport management system 102.

As illustrated in FIG. 8, the step 802 for determining the tentative route for transporting the passengers to the event includes receiving, from a passenger device, a request from the at least one client device for the passenger to travel to the event. The request may include at least one of (i) a pick up location or (ii) a drop off location for the passenger. In some embodiments, the transport management system 102 receives multiple requests from a first passenger and a second request from a second passenger, where each of the requests includes at least (i) a respective pick up location, and (ii) a respective drop off location. In some embodiments, the first and second requests may also include a respective passenger current location, a respective passenger information, a respective passenger rating, a respective passenger historical data (e.g., previous rides taken, etc.).

The step 802 for determining the tentative route for transporting the passengers to the event may include determining event information for the event scheduled to occur in the region. The event information may include at least one of (i) a time associated with the event or (ii) a location associated with the event.

Additionally, the step 802 for determining the tentative route for transporting the passengers to the event optionally includes determining event information for at least one other event scheduled to occur in the region. Consider, for example, that the city of San Francisco has a population of about 900,000 people. However, the neighboring city of Oakland has a population of about 450,000 people. The cities of San Francisco and Oakland are interconnected by the Bay Bridge, and many people living in San Francisco and Oakland frequently travel between these cities. Thus, even though the first and second passengers may provide requests to travel to an event in San Francisco, the transport management system 102 may crawl the Internet, web-based map applications, and the like to determine any other events in Oakland and San Francisco that are also occurring and may potentially affect the flow of passengers to the event.

Additionally, the step 802 for determining the tentative route for transporting the passengers to the event optionally includes determining vehicle availability for at least one transit vehicle operating along an established route. Consider, for example, that the city of San Francisco has several public transportation options (e.g., BART, CalTrain, MUNI, etc.) that may traverse the region, and in some instances, also have stops at the event. In some examples, the transport management system 102 may consider establishing a single tentative route to transport the first and second passengers due to the proximity of their final locations.

At step 804 of FIG. 8, the transport management system 102 optionally assigns a weighted value to at least one of (i) the pick up location, (ii) the drop off location, (iii) the event information, (iv) the other event information or (v) the vehicle availability. In some examples, the weighted values are different from each other.

At step 806, the transport management system 102 determines a finalized route for transporting the passengers to the event may include determining a change in status of the tentative route. Indeed, the change in status may occur when at least one selected operator is paired with the tentative route (e.g., assignment of transit vehicle with the tentative route, etc.). Consider, that the tentative route is dormant and inactive until at least one selected operator is paired with the tentative route. Additionally, a change in status of the tentative route may occur when passengers—e.g., the first passenger—discovers the tentative route and wants to utilize the tentative route as transportation to the event. In particular, the transport management system 102 is capable of publishing the tentative route. Due to demand from one or more passengers for the tentative route, the transport management system 102 is capable of finalizing the tentative route. The change in status of the tentative route may also refer to determining a vehicle status for at least one transport vehicle operating along an established route. Additionally, the change in status of the tentative route may occur when a payment is made for transportation along the tentative route. For example, if an organizer of the event, the passenger, or a third-party (i.e., neither passenger nor organizer of the event) pay for the event.

Additionally, determining the finalized route may include determining a geographical condition throughout the region associated with the tentative route. For example, the geographical conditions may indicate certain traffic conditions or weather conditions associated with one or more stops along the tentative route. Indeed, geographical conditions such as weather status and traffic status may be more dynamic and likely to change than more static data such as a requested passenger pick up location or a requested passenger drop off location. It should be noted that at least one of the aforementioned criteria is utilized for determining the finalized route; although, different combinations of the aforementioned criteria can be utilized. At step 808, the transport management system 102 publishes the finalized route to the network 150.

Figure 9:
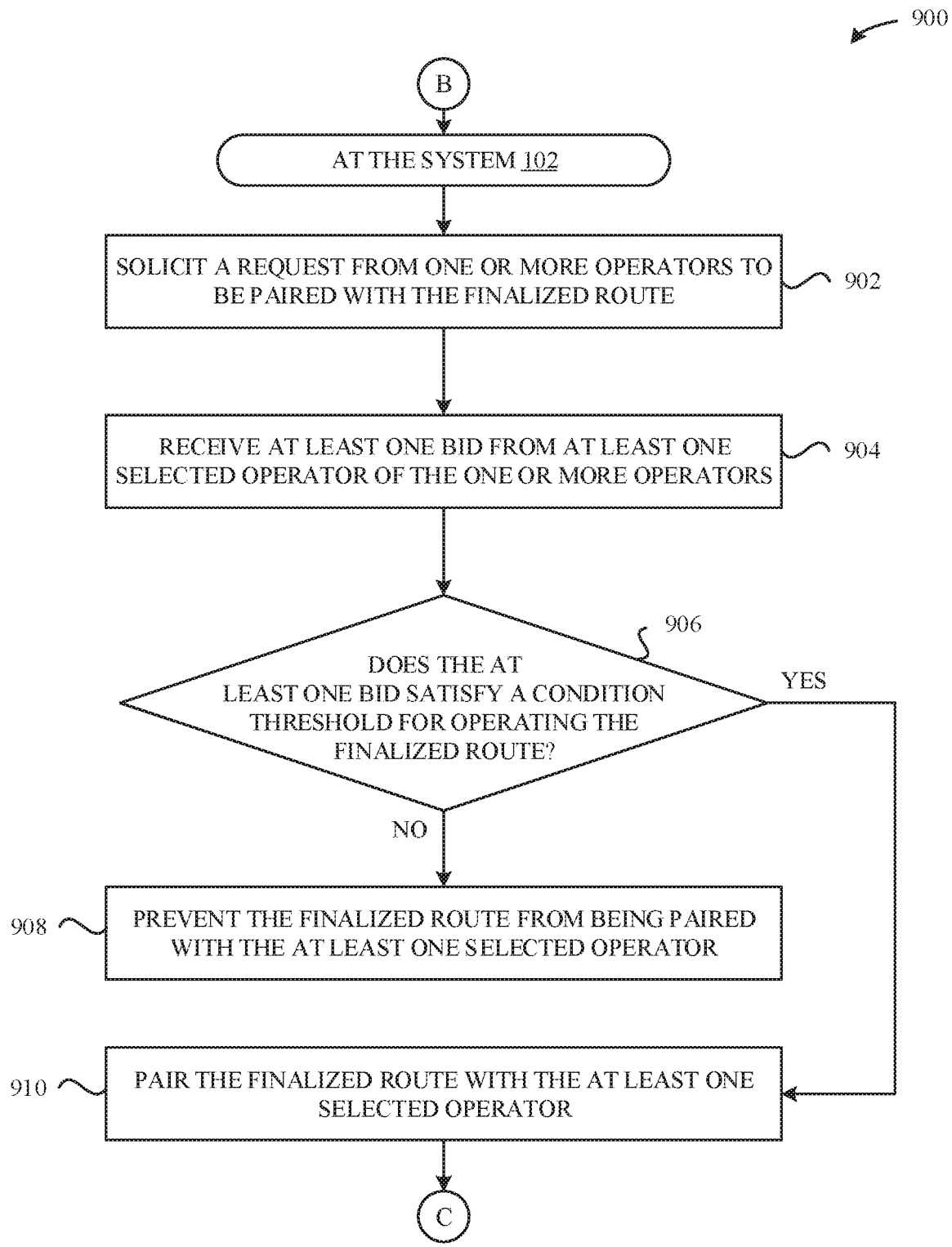
FIG. 9 illustrates a method for pairing a finalized route with an operator, according to some embodiments.

FIG. 9 illustrates a method 900 executed by the transport management system 102 for pairing a finalized route with an operator that can extend at least one of the method 800 (described in conjunction with FIG. 8), the method 1200 (described in conjunction with FIG. 12), or the method 1300 (described in conjunction with FIG. 13), according to some embodiments. The method 900 may begin subsequent to the transport management system 102 publishing the finalized route to the network 150. Once the finalized route has been published to the network 150 (e.g., the bidding marketplace 252), the transport management system solicits a request from one or more operators to be paired with the finalized route, as indicated by step 902. According to some embodiments, the pairing may be executed by the pairing operator 144 of the transport management system 102.

At step 904, the transport management system 102 receives at least one bid from at least one selected operator of the one or more operators. In some examples, the at least one bid includes at least one of the operator, the cost, and the like.

At step 906, the transport management system 102 determines whether the at least one bid satisfies a condition threshold for operating the finalized route. In some embodiments, the condition threshold may refer to a combination of the number of vehicles within the selected operator's fleet, the cost of the bid, the rating of the selected operator, and so forth. The transport management system 102 includes a pairing algorithm that is capable of pairing the at least one selected operator to the finalized route according to a best fit.

At step 908, in response to determining that the at least one bid does not satisfy the condition threshold for operating the finalized route, then the transport management system 102 prevents the finalized route from being paired with the at least one selected operator.

Returning back to step 910, in response to determining that the at least one bid satisfies the condition threshold for operating the finalized route, the transport management system 102, then the transport management system 102 pairs the finalized route with the at least one selected operator.

Figure 10:
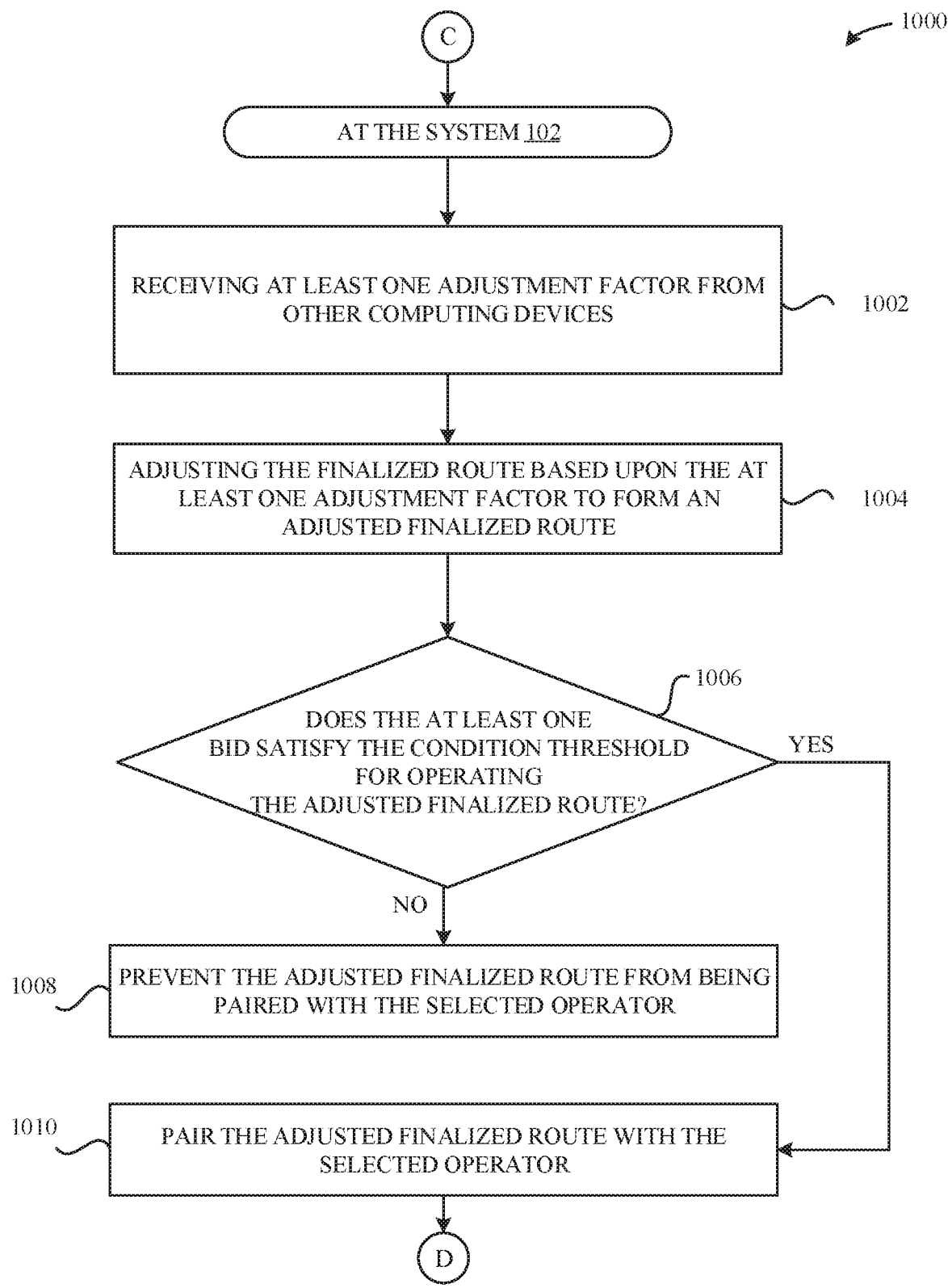
FIG. 10 illustrates a method for adjusting a finalized route, according to some embodiments.

FIG. 10 illustrates a method 1000 executed by the transport management system 102 for adjusting a finalized route that can extend the method 800 (described in conjunction with FIG. 8) or the method 900 (described in conjunction with FIG. 9), according to some embodiments. The method 1000 may begin subsequent to the transport management system 102 pairing the finalized route with the at least one selected operator. In some embodiments, the adjusted route generator 136 of the transport management system 102 adjusts the finalized route based on additional shared data received from the other computing devices.

At step 1002, the transport management system 102 receives at least one adjustment factor from the other computing devices—e.g., the geographic database 140, the network 150, the transit vehicle database 160, the passenger device 170, the driver device 180, the operator device 260. In some examples, the adjustment factor includes a geographical condition (e.g., an emergency notification, a weather condition, etc.), an adjusted passenger pick up location (e.g., if the passenger pick up location has been altered, an adjusted passenger drop off location (e.g., if the passenger drop off location has been altered), a traffic condition, weather advisory, local government authorization of the finalized route, and the like.

Additionally, the transport management system 102 is capable of receiving at least one adjustment factor from other computing devices that includes at least one of (i) pairing the at least one selected operator to the finalized route, (ii) acceptance of bids (e.g., whether the transport management system 102 accepted any of the bids provided by the operators to operate the finalized route, (iii) government approval of the finalized route and/or pairing of the finalized route with the at least one operator or (iv) estimated number of tickets that will be purchased by passengers wanting to travel along the finalized route in vehicles operated by the at least one selected operator.

At step 1004, the transport management system 102 adjusts the finalized route based on the at least one adjustment factor such as to form an adjusted finalized route. In some examples, the adjusted finalized route may also be referred to as an adjusted route. For example, even if the transport management system 102 has accepted a bid from the at least one selected operator, the transport management system 102 may be required to receive government approval prior to the at least one selected operator being able to operate along the finalized route. The transit authority in the region may reject the finalized route. Upon receiving a notification that the finalized route has been rejected (e.g., adjustment factors), the transport management system 102 is capable of adjusting the finalized route.

At step 1006, the transport management system 102 determines whether the at least one bid satisfies the condition threshold for operating the adjusted finalized route. For example, the condition threshold can include determining whether operating along the adjusted finalized route remains profitable for the at least one selected operator. In another example, the condition threshold can include determining whether transporting passengers along the adjusted finalized route will satisfy the demand for transportation to the event.

At step 1008, in response to determining that the at least one bid does not satisfy the condition threshold for operating the adjusted finalized route, then the transport management system 102 prevents the adjusted finalized route from being paired with the at least one selected operator. For example, the transport management system 102 may withdraw the pairing.

Returning back to step 1010, in response to determining that the at least one bid satisfies the condition threshold for operating the adjusted route, then the transport management system 102 continues to allow the adjusted finalized route to be paired with the at least one selected operator.

Figure 11:
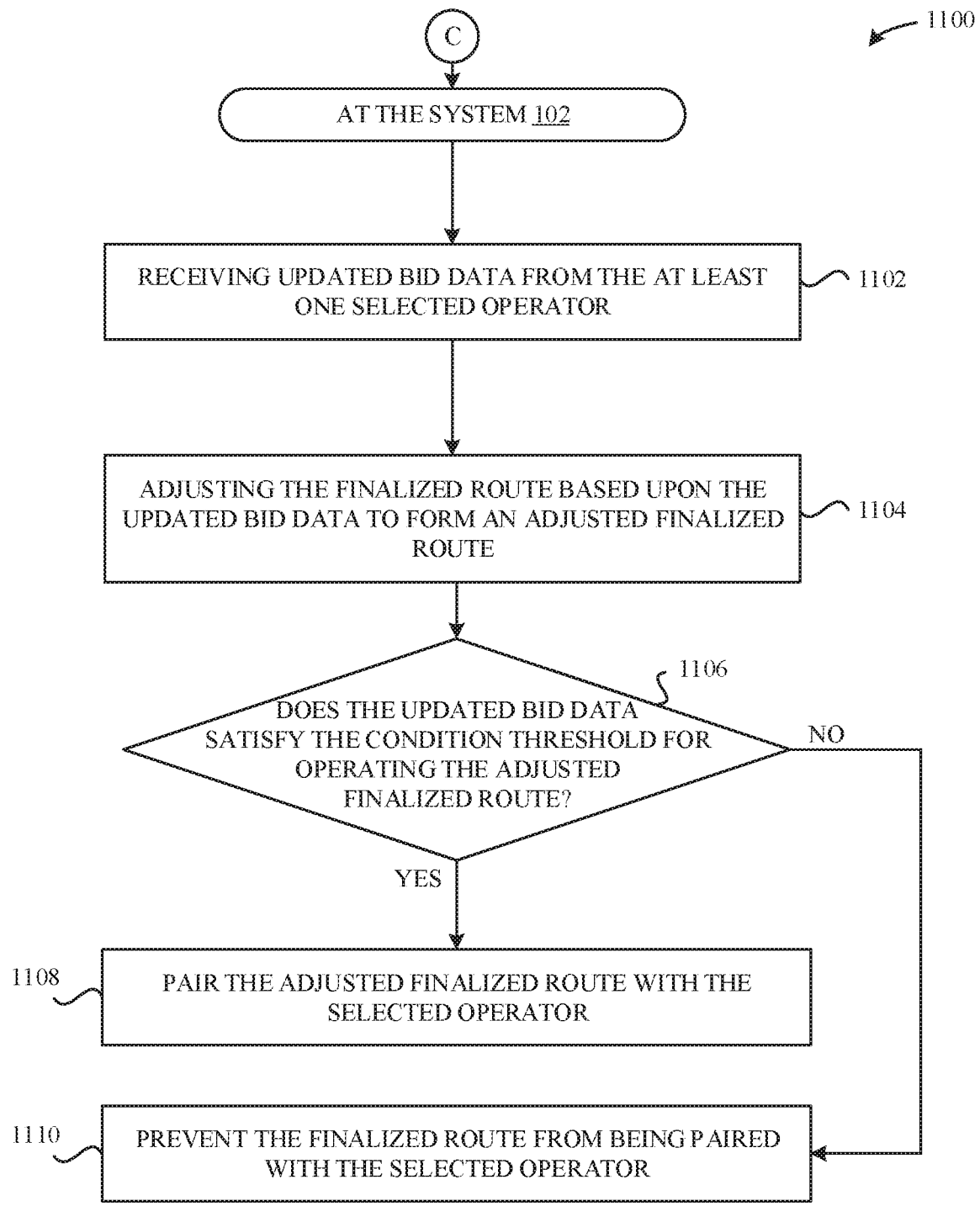
FIG. 11 illustrates a method for pairing an adjusted finalized route with an operator, according to some embodiments.

FIG. 11 illustrates a method 1100 executed by the transport management system 102 for pairing an adjusted finalized route with an operator, according to some embodiments. In some embodiments, the method 1100 can extend the method 900 (described in conjunction with FIG. 9). The method 1100 may begin subsequent to the transport management system 102 pairing the finalized route with the at least one selected operator. In some embodiments, the adjusted route generator 136 of the transport management system 102 adjusts the finalized route based on updated bid data associated with an operator bid 254 received from the at least one selected operator.

At step 1102, the transport management system 102 receives updated bid data from the at least one selected operator, where the updated bid data updates at least one of (i) the vehicle availability, (ii) the availability of a driver associated with the at least one selected operator, or (iii) the cost. In some examples, the at least one selected operator may provide updated bid data in response to receiving a notification of the number of passengers who have purchased tickets to travel along the finalized route in vehicles operated by the at least one selected operator.

At step 1104, the transport management system 102 adjust the finalized route based on the at least one adjustment factor based on the updated bid data such as to form an adjusted finalized route. In some examples, the adjusted finalized route may also be referred to as an adjusted route.

At step 1106, the transport management system 102 determines whether the updated bid data satisfies the condition threshold for operating the adjusted finalized route. For example, the condition threshold can include determining whether operating along the adjusted finalized route remains profitable for the at least one selected operator. In another example, the condition threshold can include determining whether transporting passengers along the adjusted finalized route will satisfy the demand for transportation to the event.

At step 1108, in response to determining that the updated bid data satisfies the condition threshold for operating the adjusted route, then the transport management system 102 continues to allow the adjusted finalized route to be paired with the at least one selected operator.

Alternatively, at step 1110, in response to determining that the updated bid data does not satisfy the condition threshold for operating the adjusted finalized route, then the transport management system 102 prevents the adjusted finalized route from being paired with the at least one selected operator. For example, the transport management system 102 may withdraw the pairing.

Figure 12:
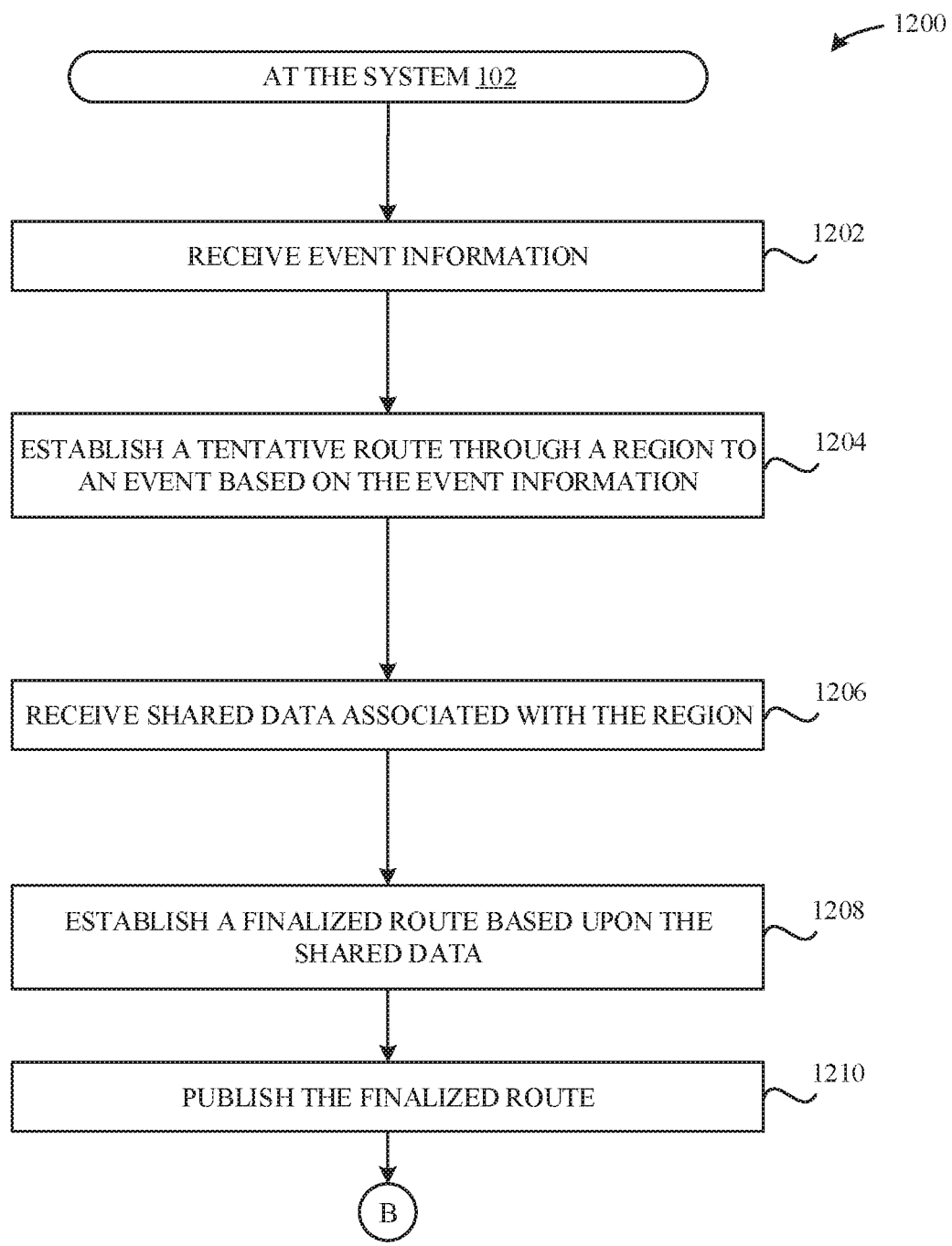
FIG. 12 illustrates a method for generating a finalized route, according to some embodiments.

FIG. 12 illustrates a method 1200 executed by the transport management system 102 for generating a finalized route, according to some embodiments. In contrast to the method 800, the method 1200 may be executed by the transport management system 102 without having previously received one or more requests from passengers requesting transportation to an event. Instead the transport management system 102 generates a finalized route by searching the geographic database 140 (e.g., Internet, social media postings, traffic alerts, online ads, etc.) to determine an event that is scheduled to occur in a region and/or demand for attendees that plan to attend the event.

As illustrated in FIG. 12, the method 1200 begins at step 1202, where the transport management system 102 receives event information 235 from the geographic database 140. In some embodiments, the tentative route generator 132 generates a tentative route in response to one or more events that are scheduled to occur in the region. Consider, for example, that the tentative route generator 132 of the route generator module 130 receives event information 235 that indicates an event ("TECHCRUNCH DISRUPT") is scheduled to occur at the ("MOSCONE CENTER"). The tentative route generator 132 receives event information 235 indicating a high demand of attendees that plan to attend the event based upon number of attendees registered to attend the event, online ads advertising the event, social media posts, and number of attendees who have booked reservations at hotels nearby the event. For instance, the tentative route generator 132 may determine that a large number of attendees to the event have reserved rooms at the ("WESTIN HOTEL") and the ("FAIRMONT HOTEL").

At step 1204 of FIG. 12, the tentative route generator 132 establishes a tentative route based on the event information 235. For example, the tentative route generator establishes a tentative route that includes stops at the ("WESTIN HOTEL") and the ("FAIRMONT HOTEL").

At step 1206, the transport management system 102 receives shared data associated with the region. The shared data may be received from the geographic database 140, wherein the shared data includes at least one of (i) historical data, (ii) traffic conditions, (iii) event information, (iv) other event information, (v) weather conditions, or (vi) emergency notifications. Consider, for example, that the tentative route generator 132 receives shared data from the geographic database 140 that indicates that a large number of attendees to the event have also reserved rooms at the ("PALACE HOTEL"). Additionally, the transport management system 102 receives shared data from the geographic database 140 that indicates closed streets between the ("MOSCONE CENTER") and the ("PALACE HOTEL").

At step 1208, the finalized route generator 134 establishes a finalized route based upon the received shared data. In particular, the finalized route generator 134 is capable of individually weighing each of the shared data to establish weighted values for each of the shared data. For example, the finalized route generator 132 may determine that the shared data indicating the large number of attendees to the ("PALACE HOTEL") is weighted more heavily than the traffic conditions indicating closed streets between the ("MOSCONE CENTER") and the ("PALACE HOTEL").

At step 1210, the transport management system 102 publishes the finalized route to the network 150. Notably, the techniques described with reference to FIG. 12 involves establishing a finalized route that links multiple stops where established routes linking these multiple stops did not previously exist.

Figure 13:
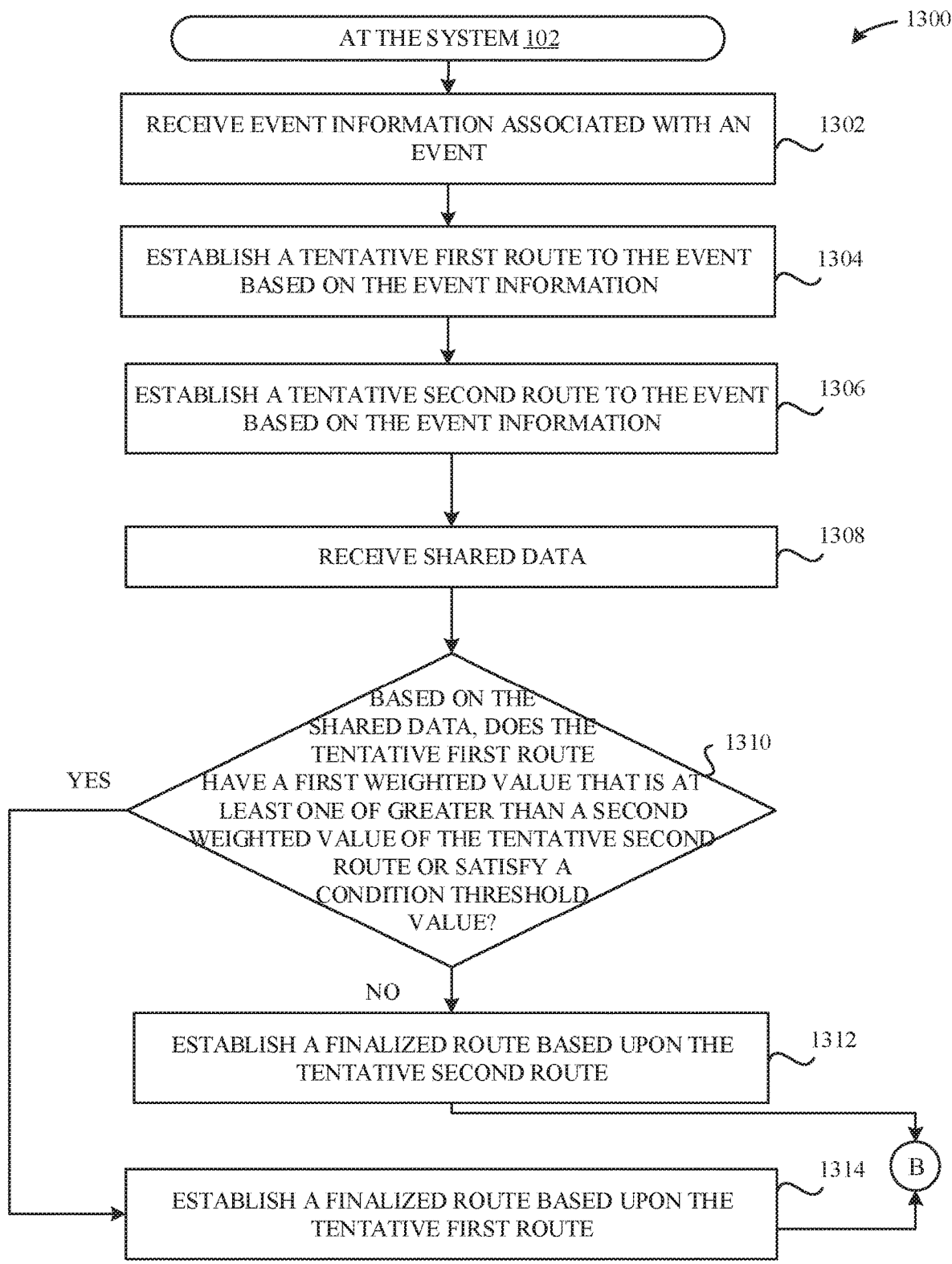
FIG. 13 illustrates a method for generating a finalized route, according to some embodiments.

FIG. 13 illustrates a method 1300 executed by the transport management system 102 for generating a finalized route, according to some embodiments. In contrast to the method 800, the method 1300 is executed by the transport management system 102 without having previously received one or more requests from passengers requesting transportation to an event. Instead the transport management system 102 generates a finalized route by searching the geographic database 140 (e.g., Internet, social media postings, traffic alerts, online ads, etc.) to determine an event that is scheduled to occur in a region and/or demand for attendees that plan to attend the event. In some examples, the transport management system 102 generates a tentative route based upon historical demand.

As illustrated in FIG. 13, the method 1300 begins at step 1302, where the transport management system 102 receives event information 235 from the geographic database 140. In some embodiments, the tentative route generator 132 generates a tentative route in response to one or more events that are scheduled to occur in the region. For example, the tentative route generator 132 receives historical data 232 from the geographic database 140 that indicates that an event ("OKTOBERFEST BY THE BAY") took place at ("PIER 35") during the third weekend of September of last year. Additionally, the tentative route generator 132 also receives event information 235 indicating a large number of attendees who plan to attend the event ("OKTOBERFEST BY THE BAY") are staying at the ("HYATT REGENCY") and "HOLIDAY INN EXPRESS").

At step 1304 of FIG. 13, the tentative route generator 132 establishes a first tentative route based on the event information 235. For example, the tentative route generator 132 establishes a tentative route that includes stops at the at the ("HYATT REGENCY") and "HOLIDAY INN EXPRESS") on the way to the event.

At step 1306, the tentative route generator 132 establishes a second tentative route based on the event information 235. For example, the tentative route generator 132 may have previously received shared data at step 1302 that indicates that a large number of attendees to the event are staying at ("OMNI SAN FRANCISCO"). However, the route between the ("OMNI SAN FRANCISCO") and the event is in the opposite direction of the route that includes stops at the ("HYATT REGENCY") and "HOLIDAY INN EXPRESS") on the way to the event.

At step 1308, the transport management system 102 receives shared data from the geographic database 140, wherein the shared data includes at least one of (i) historical data, (ii) traffic conditions, (iii) event information, (iv) other event information, (v) weather conditions, or (vi) emergency notifications. Consider, for example, that the transport management system 102 receives shared data including event information 235 from the geographic database 140 that indicates that more attendees will be transported along the first tentative route than along the second tentative route. The tentative route generator 132 may establish a first weighted value for the first tentative route based on the shared data and a second weighted value for the second tentative route based on the shared data.

At step 1310, the transport management system 102 may determine, based on the received shared data, whether the first weighted value of the tentative first route is at least one of greater than the second weighted value of the second tentative route or satisfies a condition threshold value. Consider, for example, that the transport management system 102 determines that more passengers will be picked up along the first tentative route; thereby, maximizing the number of passengers and revenue generated by the operator of the first tentative route. As a result, the transport management system 102 may weigh the first tentative route more heavily than the second tentative route. Additionally, the transport management system 102 is capable of determining whether the first weighted value is greater than the second weighted value and satisfies a condition threshold value.

At step 1312, in response to determining that the first weighted value is less than the second weighted value and/or satisfies the condition threshold value, then the transport management system 102 establishes a finalized route based on the tentative second route.

Alternatively, at step 1314, in response to determining that the first weighted value is greater than the second weighted value and/or does not satisfy the condition threshold value, then the transport management system 102 establishes a finalized route based on the tentative first route. Notably, the techniques described with reference to FIG. 13 involves establishing a finalized route that links multiple stops where established routes linking these multiple stops did not previously exist.

Figure 14:
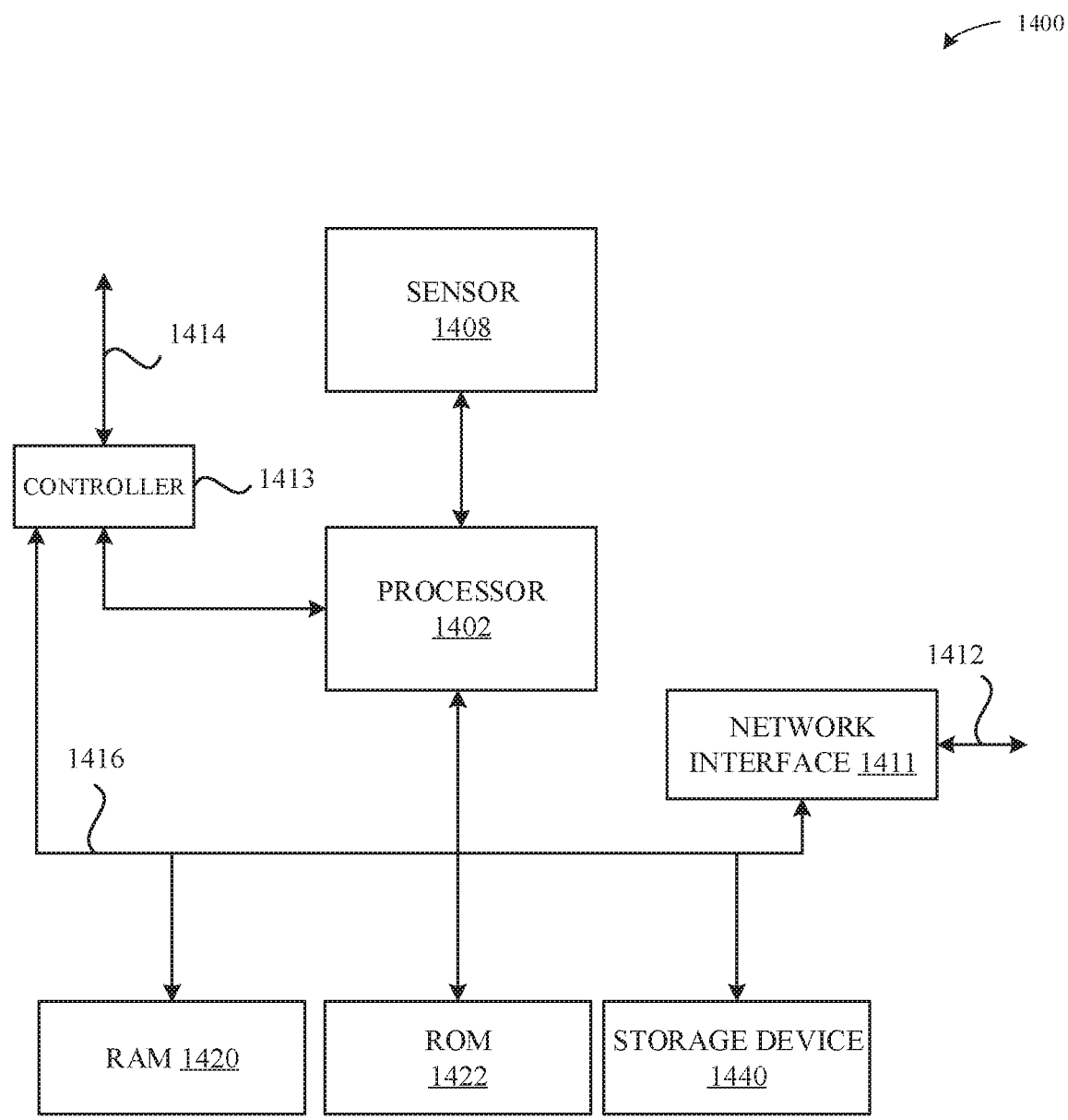
FIG. 14 illustrates a detailed view of a system configured to implement the various techniques described herein, according to some embodiments.

FIG. 14 illustrates a system diagram of a system 1400 configured to implement the various techniques described herein, according to some embodiments. For example, the system view illustrates various components that are part of the system 100 described in conjunction with FIG. 1. As illustrated in FIG. 14, the system 1400 can include a processor 1402 that represents a microprocessor or controller for controlling the overall operation of the system 1400. The system 1400 can also include a sensor device 1408 that is capable of detecting data associated with a transit vehicle and/or directly from an operator associated with the transit vehicle.

Still further, the system 1400 can include a data bus 1416 can facilitate data transfer between at least a storage device 1440, the processor 1402, and a controller 1413. The controller 1413 can be used to interface with and control different equipment through an equipment control bus 1414. The system 1400 can also include a network/bus interface 1411 that couples to a data link 1412. In the case of a wireless connection, the network/bus interface 1411 can include a wireless transceiver. In some examples, the network/bus interface 1411 facilitates communication between the system 1400 and the passenger device 170, the driver device 180, and the like.

As noted above, the system 1400 also includes the storage device 1440, which can comprise a single disk or a collection of disks (e.g., hard drives). In some embodiments, storage device 1440 can include flash memory, semiconductor (solid state) memory or the like. The system 1400 can also include a Random-Access Memory (RAM) 1420 and a Read-Only Memory (ROM) 1422. The ROM 1422 can store programs, utilities or processes to be executed in a non-volatile manner. The RAM 1420 can provide volatile data storage, and stores instructions related to the operation of applications executing on the system 1400. The storage device 1440 may include at least one memory that stores instructions that include the various steps of any of the foregoing methods. The storage device 1440 may include at least one non-transitory computer readable storage medium that stores instructions that include the various steps of any of the foregoing methods. The instructions may be executed by at least one processor—e.g., the processor 1402.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
receiving, by a computing device from client device associated with a passenger, a request to travel to an event at a region, the request comprising (i) a pick up location and (ii) a drop off location;
determining, by the computing device, event information for the event comprising (i) a time associated with the event and (ii) a location associated with the event;
determining, by the computing device, based at least on the request from the passenger and determined the event information, a tentative route, the tentative route being a first transportation route for the passenger to travel from the pick up location to the drop off location with an estimated time of arrival at the location of the event that corresponds to the time of the event;
determining, by the computing device, a condition association with the region that prevents the tentative route from enabling the estimated time of arrival corresponding to the time of the event, the condition being a current geographical condition impacting travel in and around the region;
automatically adjusting, by the computing device, the tentative route by adjusting at least one of the pick up location and the drop off location;

determining, by the computing device, a finalized route based on the adjustment of the tentative route, the finalized route being the adjusted tentative route;

providing, by the computing device over a network, in response to the request from the passenger, the finalized route to the client device of the passenger; and publishing, by the computing device, the finalized route to a database.

2. The method of claim 1, wherein determining the tentative route further comprises:

determining vehicle availability for at least one transit vehicle that operates along an established route in the region, the vehicle availability includes at least one of (i) a schedule for the established route and (ii) one or more stops that comprise the established route.

3. The method of claim 2, further comprising:

assigning a respective weighted value for at least one of (i) the pick up location, (ii) the drop off location, (iii) the event information, and (iv) the vehicle availability; and determining the finalized route based at least on the respective weighted values.

4. The method of claim 1, further comprising:

receiving at least one adjustment factor corresponding to at least one of a weather condition and emergency notification, demand for the tentative route and bid data from an operator; and adjusting the finalized route according to the at least one adjustment factor.

5. The method of claim 4, further comprising:

replacing the finalized route published at the database with the adjusted finalized route.

6. The method of claim 1, further comprising:

soliciting a request from one or more operators to be paired with the finalized route;

receiving, from a selected operator of the one or more operators, a bid for the finalized route;

determining that the selected operator satisfies a condition threshold for operating the finalized route; and pairing the finalized route with the selected operator.

7. The method of claim 6, further comprising:

receiving updated bid data from the selected operator; and adjusting the finalized route based upon the updated bid data.

8. The method of claim 6, further comprising:

determining that the selected operator does not satisfy the condition threshold for operating the finalized route; and preventing the selected operator from being paired with the finalized route.

9. A non-transitory computer-readable storage medium tangibly encoded with computer-executable instructions, that when executed by a computing device, perform a method comprising:

receiving, by the computing device from client device associated with a passenger, a request to travel to an event at a region, the request comprising (i) a pick up location and (ii) a drop off location;

determining, by the computing device, event information for the event comprising (i) a time associated with the event and (ii) a location associated with the event;

determining, by the computing device, based at least on the request from the passenger and determined the event information, a tentative route, the tentative route being a first transportation route for the passenger to travel from the pick up location to the drop off location with an estimated time of arrival at the location of the event that corresponds to the time of the event;

determining, by the computing device, a condition association with the region that prevents the tentative route from enabling the estimated time of arrival corresponding to the time of the event, the condition being a current geographical condition impacting travel in and around the region;

automatically adjusting, by the computing device, the tentative route by adjusting at least one of the pick up location and the drop off location;

determining, by the computing device, a finalized route based on the adjustment of the tentative route, the finalized route being the adjusted tentative route;

providing, by the computing device over a network, in response to the request from the passenger, the finalized route to the client device of the passenger; and publishing, by the computing device, the finalized route to a database.

10. The non-transitory computer-readable storage medium of claim 9, wherein determining the tentative route further comprises:

determining vehicle availability for at least one transit vehicle that operates along an established route in the region, the vehicle availability includes at least one of (i) a schedule for the established route and (ii) one or more stops that comprise the established route.

11. The non-transitory computer-readable storage medium of claim 10, further comprising:

assigning a respective weighted value for at least one of (i) the pick up location, (ii) the drop off location, (iii) the event information, and (iv) the vehicle availability; and determining the finalized route based at least on the respective weighted values.

12. The non-transitory computer-readable storage medium of claim 9, further comprising:

receiving at least one adjustment factor corresponding to at least one of a weather condition and emergency notification, demand for the tentative route and bid data from an operator; and adjusting the finalized route according to the at least one adjustment factor.

13. The non-transitory computer-readable storage medium of claim 12, further comprising:

replacing the finalized route published at the database with the adjusted finalized route.

14. The non-transitory computer-readable storage medium of claim 9, further comprising:

soliciting a request from one or more operators to be paired with the finalized route;

receiving, from a selected operator of the one or more operators, a bid for the finalized route;

determining that the selected operator satisfies a condition threshold for operating the finalized route; and pairing the finalized route with the selected operator.

15. The non-transitory computer-readable storage medium of claim 14, further comprising:

receiving updated bid data from the selected operator; and adjusting the finalized route based upon the updated bid data.

16. The non-transitory computer-readable storage medium of claim 14, further comprising:

determining that the selected operator does not satisfy the condition threshold for operating the finalized route; and preventing the selected operator from being paired with the finalized route.

17. A computing device, comprising:

a processor configured to:

receive, from client device associated with a passenger, a request to travel to an event at a region, the request comprising (i) a pick up location and (ii) a drop off location;

determine event information for the event comprising (i) a time associated with the event and (ii) a location associated with the event;

determine, based at least on the request from the passenger and determined the event information, a tentative route, the tentative route being a first transportation route for the passenger to travel from the pick up location to the drop off location with an estimated time of arrival at the location of the event that corresponds to the time of the event;

determine a condition association with the region that prevents the tentative route from enabling the estimated time of arrival corresponding to the time of the event, the condition being a current geographical condition impacting travel in and around the region;

automatically adjust the tentative route by adjusting at least one of the pick up location and the drop off location;

determine a finalized route based on the adjustment of the tentative route, the finalized route being the adjusted tentative route;

provide, over a network, in response to the request from the passenger, the finalized route to the client device of the passenger; and publish the finalized route to a database.

18. The computing device of claim 17, further comprising:

solicit a request from one or more operators to be paired with the finalized route;

receive, from a selected operator of the one or more operators, a bid for the finalized route;

determine that the selected operator satisfies a condition threshold for operating the finalized route; and pair the finalized route with the selected operator.

19. The computing device of claim 18, further comprising:

receive updated bid data from the selected operator; and adjust the finalized route based upon the updated bid data.

20. The computing device of claim 18, further comprising:

determine that the selected operator does not satisfy the condition threshold for operating the finalized route; and prevent the selected operator from being paired with the finalized route.

* * * * *